United States Patent
Fujisaki et al.

(10) Patent No.: US 9,946,054 B2
(45) Date of Patent: Apr. 17, 2018

(54) ZOOM LENS AND IMAGE PICKUP APPARATUS INCLUDING THE SAME

(71) Applicant: CANON KABUSHIKI KAISHA, Tokyo (JP)

(72) Inventors: Toyokatsu Fujisaki, Utsunomiya (JP); Hiroshi Saruwatari, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/815,617

(22) Filed: Jul. 31, 2015

(65) Prior Publication Data

US 2016/0033748 A1    Feb. 4, 2016

(30) Foreign Application Priority Data

Aug. 4, 2014 (JP) ................. 2014-158962

(51) Int. Cl.
  *G02B 15/16* (2006.01)
  *G02B 15/173* (2006.01)
  *G02B 27/64* (2006.01)

(52) U.S. Cl.
  CPC ........... *G02B 15/16* (2013.01); *G02B 15/173* (2013.01); *G02B 27/646* (2013.01)

(58) Field of Classification Search
  CPC ...... G02B 15/00; G02B 15/14; G02B 15/173; G02B 15/15; G02B 15/16; G02B 15/20
  USPC .................. 359/676–678, 683–687
  See application file for complete search history.

(56) References Cited

U.S. PATENT DOCUMENTS

| | | | |
|---|---|---|---|
| 2010/0302650 A1* | 12/2010 | Fujisaki | G03B 5/00 359/686 |
| 2013/0017385 A1 | 1/2013 | Lozoya-Lopez | |
| 2013/0242169 A1* | 9/2013 | Okubo | G02B 15/173 348/345 |
| 2014/0022417 A1 | 1/2014 | Yokoyama | |

FOREIGN PATENT DOCUMENTS

| | | |
|---|---|---|
| CN | 101900871 A | 12/2010 |
| CN | 103454755 A | 12/2013 |
| JP | 2013-156406 A | 8/2013 |
| JP | 2013-190453 A | 9/2013 |
| JP | 2013-190741 A | 9/2013 |

\* cited by examiner

*Primary Examiner* — Darryl J Collins
*Assistant Examiner* — Journey Sumlar
(74) *Attorney, Agent, or Firm* — Canon USA Inc., IP Division

(57) ABSTRACT

A zoom lens includes, in order from an object side to an image side, a first lens unit having positive refractive power, a second lens unit having negative refractive power, a third lens unit having positive refractive power, and a rear lens group including a lens unit having negative refractive power arranged along an optical axis thereof. A focal length fw of the zoom lens at a wide-angle end, a focal length ft of the zoom lens at a telephoto end, an amount of movement M1 of the first lens unit on the optical axis in zooming from the wide-angle end to the telephoto end, and a focal length frn of a lens unit Lrn that is a lens unit having a shortest focal length among lens units having negative refractive power included in the rear lens group are appropriately set based on predetermined mathematical conditions.

13 Claims, 17 Drawing Sheets

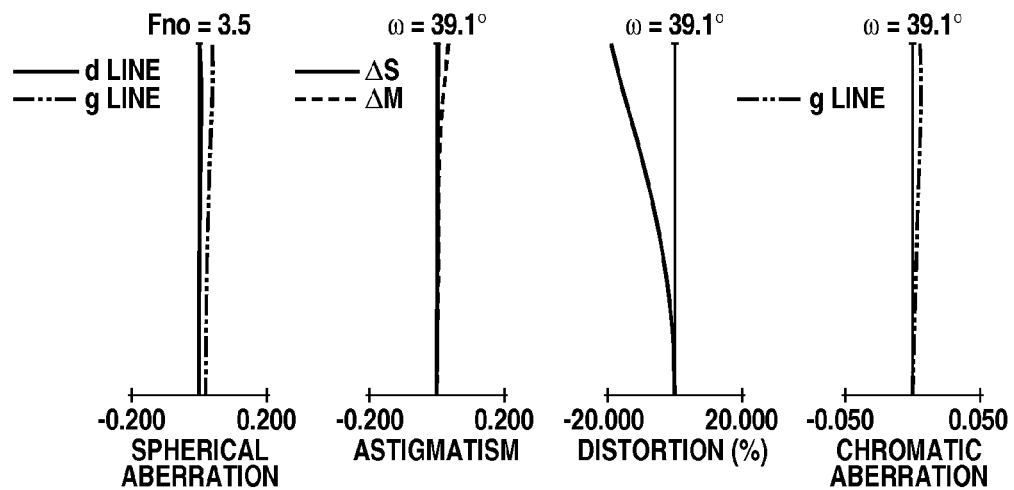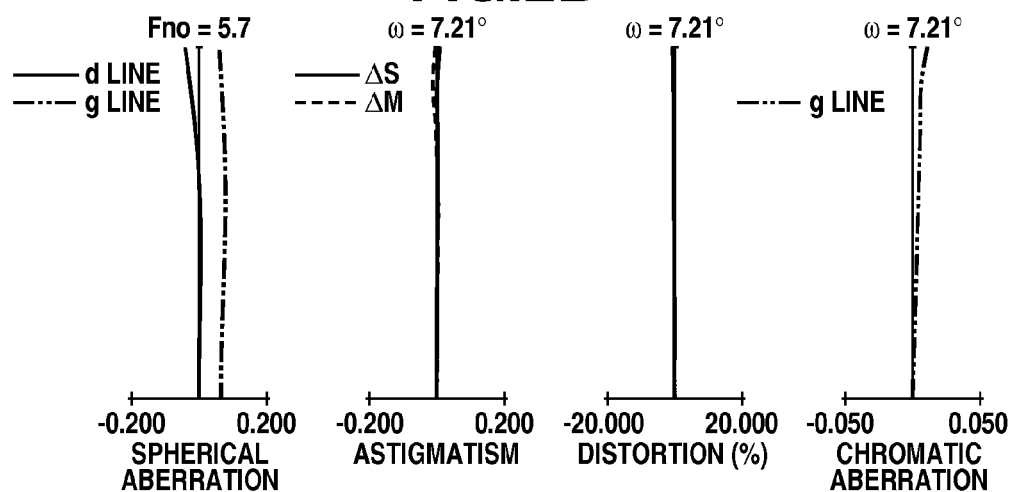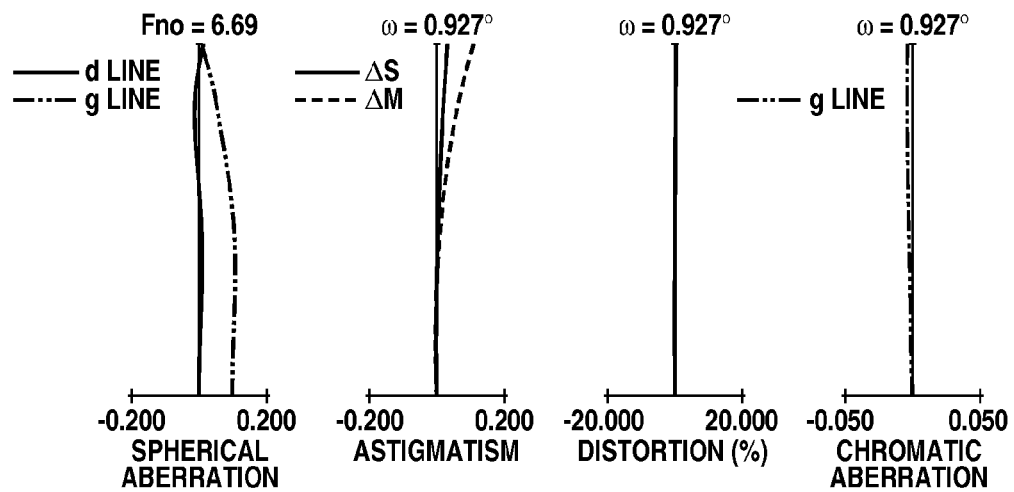

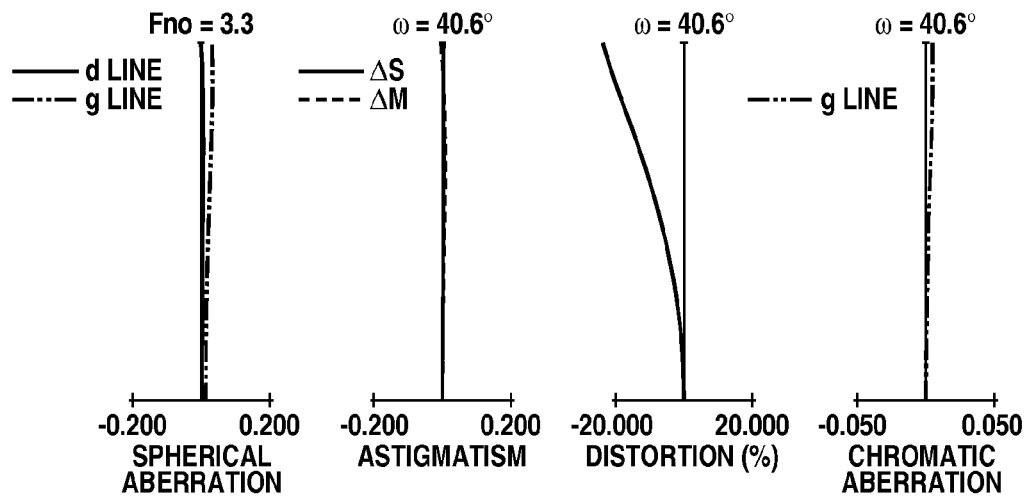
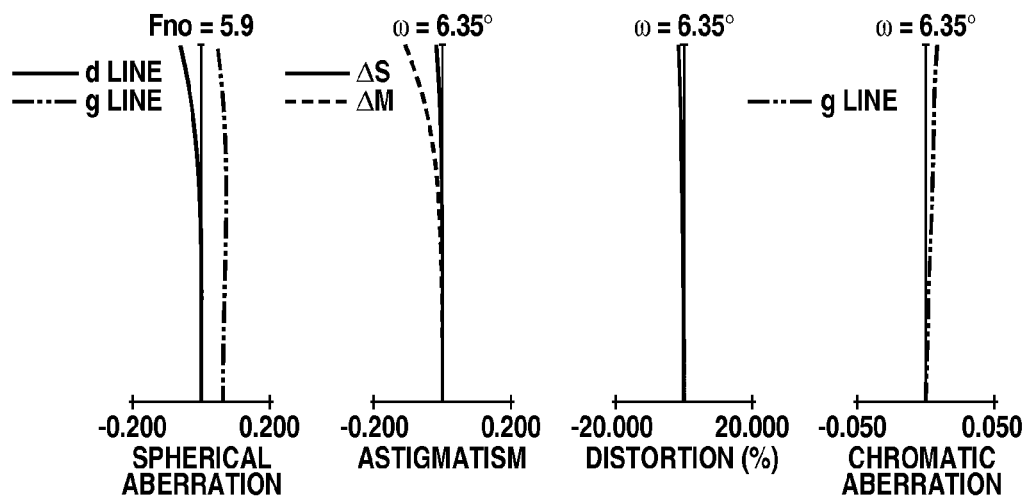
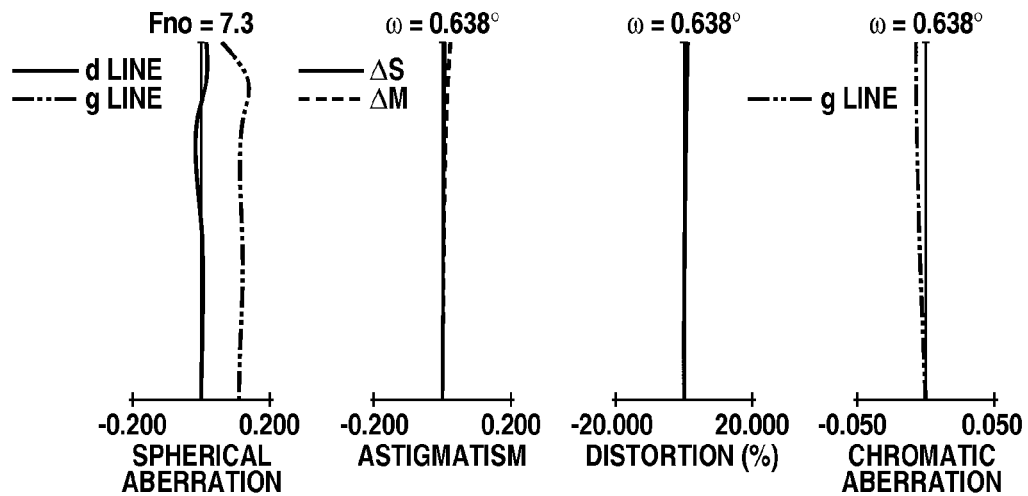

ZOOM LENS AND IMAGE PICKUP APPARATUS INCLUDING THE SAME

BACKGROUND OF THE INVENTION

Field of the Invention

The present invention relates to a zoom lens and an image pickup apparatus including the zoom lens. The zoom lens is considered suitable for an image pickup apparatus using an image sensor, such as a digital still camera, a video camera, a monitoring camera, or a broadcasting camera, or an image pickup apparatus such as a camera using a silver-halide photographic film, for example.

Description of the Related Art

In recent years, image pickup apparatuses using a solid-state image sensor, such as a digital camera and video camera, have achieved high functionality and a decrease in size of the entire apparatus. Zoom lenses used in these apparatuses are required to be small and have high magnification and favorable optical performance. To respond to these demands, a zoom lens including a lens unit having positive, negative, and positive refractive power in order from an object side to an image side is known.

A zoom lens discussed in Japanese Patent Application Laid-Open No. 2013-190741 describes a zoom lens with high magnification exceeding 90 times, by moving a first lens unit to the object side in a large zooming range.

If an amount of movement of the first lens unit to an object side in zooming is made too large to realize high magnification in the zoom lens, the overall lens length is increased. This is particularly true in a zoom lens including lens units having positive, negative, and positive refractive power in order from the object side to an image side, as each lens unit needs to be accurately controlled during zooming. Therefore, for example, if the refractive power of a second lens unit serving as a magnification varying unit is excessively increased, excessive curvature of field is often generated.

SUMMARY OF THE INVENTION

The present invention describes various embodiments directed to a zoom lens including, in order from an object side to an image side, a first lens unit having positive refractive power, a second lens unit having negative refractive power, a third lens unit having positive refractive power, and a rear lens group including a plurality of lens units including a lens unit having negative refractive power, wherein a distance between adjacent lens units is changed in zooming, wherein two or more lens units of the lens units included in the rear lens group are moved in zooming from a wide-angle end to a telephoto end, and wherein following conditional equations are satisfied:

$$12.00 < M1/fw < 23.00$$

$$-18.00 < ft/frn < -8.30$$

where a focal length of the zoom lens at the wide-angle end is fw, the focal length of the zoom lens at the telephoto end is ft, an amount of movement of the first lens unit on an optical axis in zooming from the wide-angle end to the telephoto end is M1, and a focal length of a lens unit Lrn is frn, the lens unit Lrn being a lens unit having a shortest focal length among lens units having negative refractive power included in the rear lens group.

Further features of the present invention will become apparent from the following description of exemplary embodiments with reference to the attached drawings.

BRIEF DESCRIPTION OF THE DRAWINGS

FIGS. 2A to 2C are aberration diagrams of the zoom lens at the wide-angle end, at a middle zoom position, and at a telephoto end according to the first exemplary embodiment.

FIGS. 12A to 12C are aberration diagrams of the zoom lens at the wide-angle end, at the middle zoom position, and at the telephoto end according to the sixth exemplary embodiment.

Hereinafter, a zoom lens and an image pickup apparatus including the zoom lens of an exemplary embodiment of the present invention will be described in detail based on the appended drawings. A zoom lens of an exemplary embodiment of the present invention includes, in order from an object side to an image side, a first lens unit having positive refractive power, a second lens unit having negative refractive power, a third lens unit having positive refractive power, and a rear lens group including two or more lens units. The rear lens group has lens units having negative refractive power. Here, the lens units need to include one or more lenses, but may or may not include a plurality of lenses.

Figure 1:
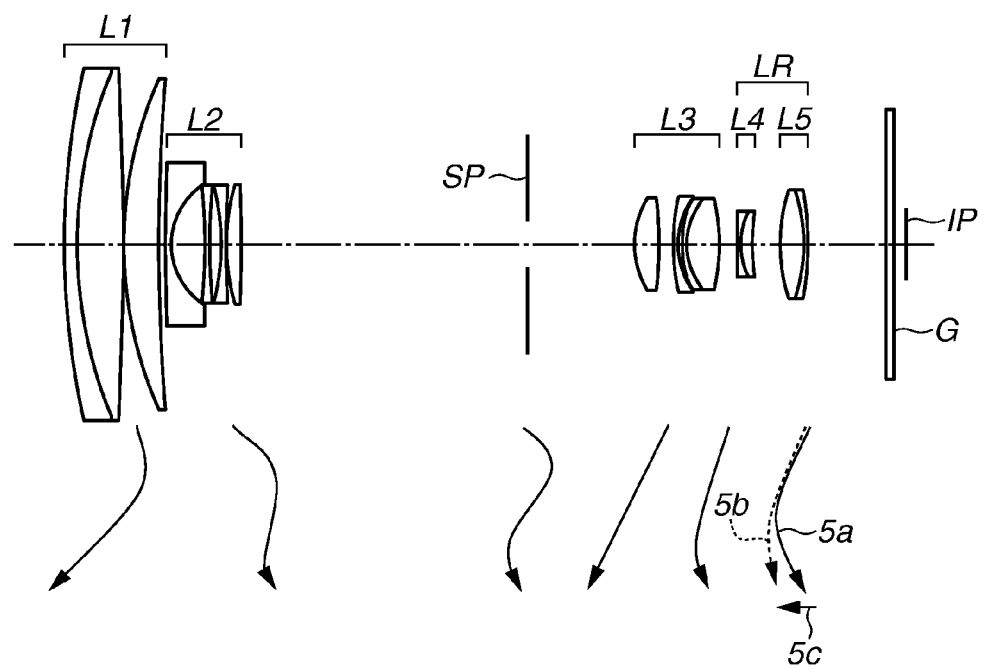
FIG. 1 is a cross-sectional view of a zoom lens at a wide-angle end according to a first exemplary embodiment.
Figure 3:
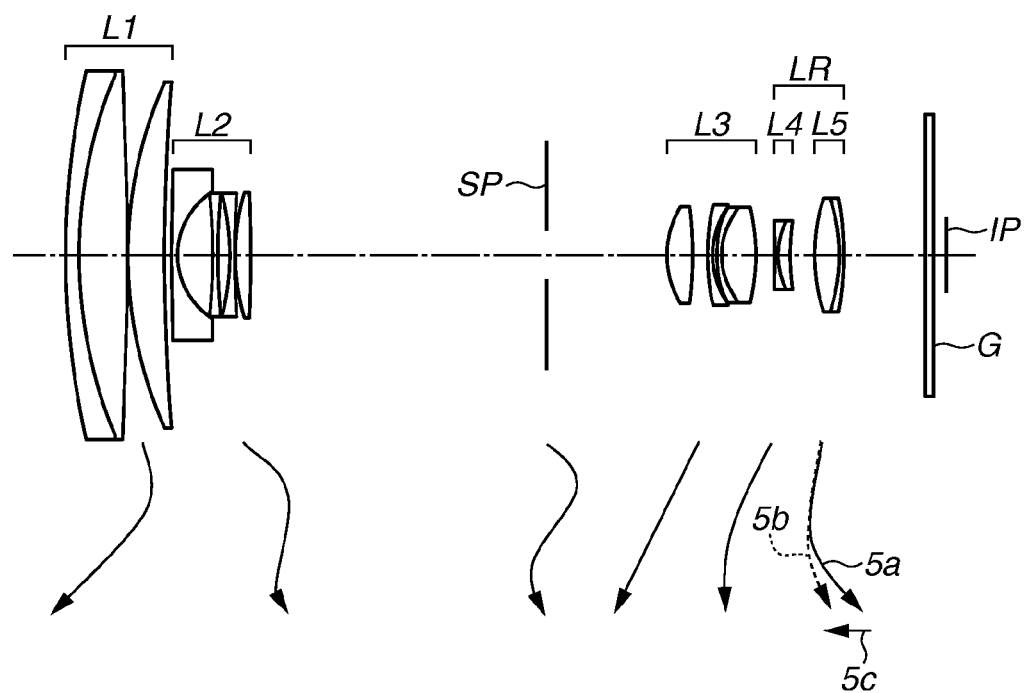
FIG. 3 is a cross-sectional view of a zoom lens at the wide-angle end according to a second exemplary embodiment.
Figure 4A:
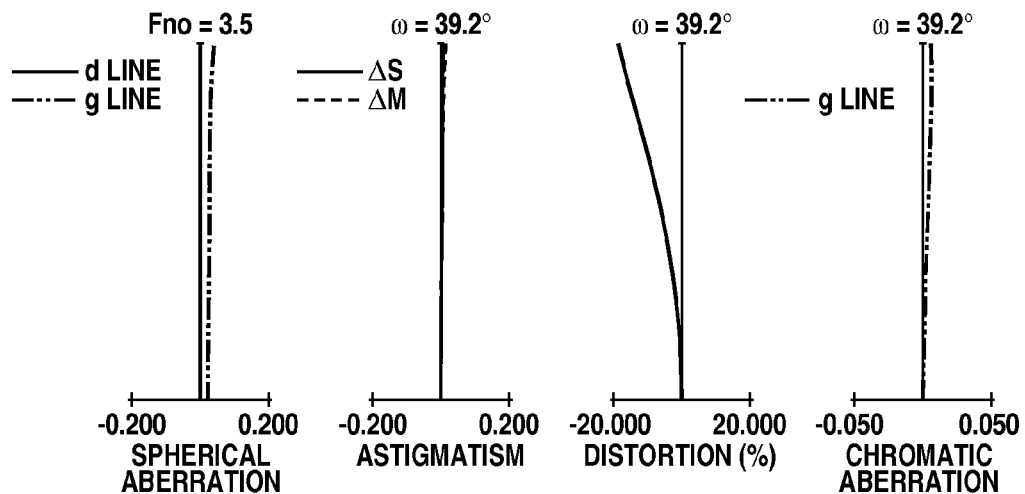
FIGS. 4A to 4C are aberration diagrams of the zoom lens at the wide-angle end, at the middle zoom position, and at the telephoto end according to the second exemplary embodiment.
Figure 4B:
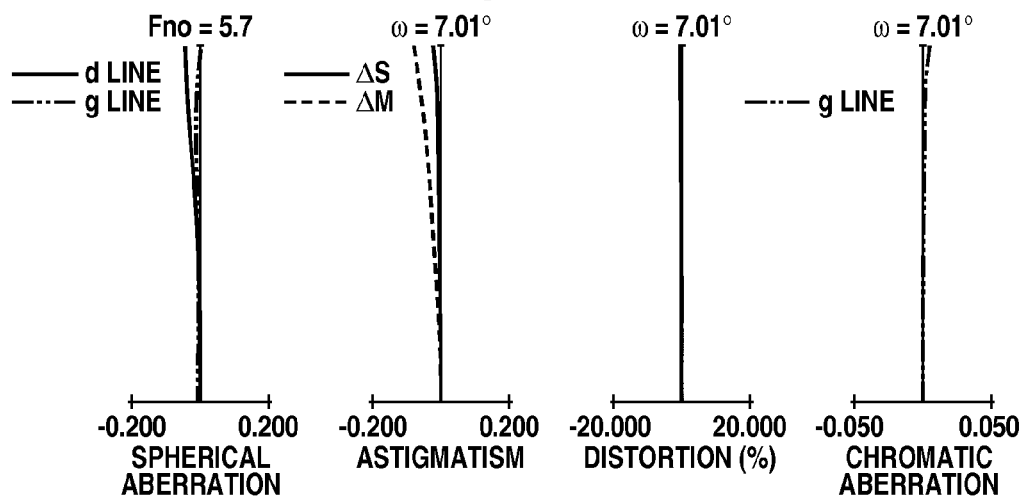
Figure 4C:
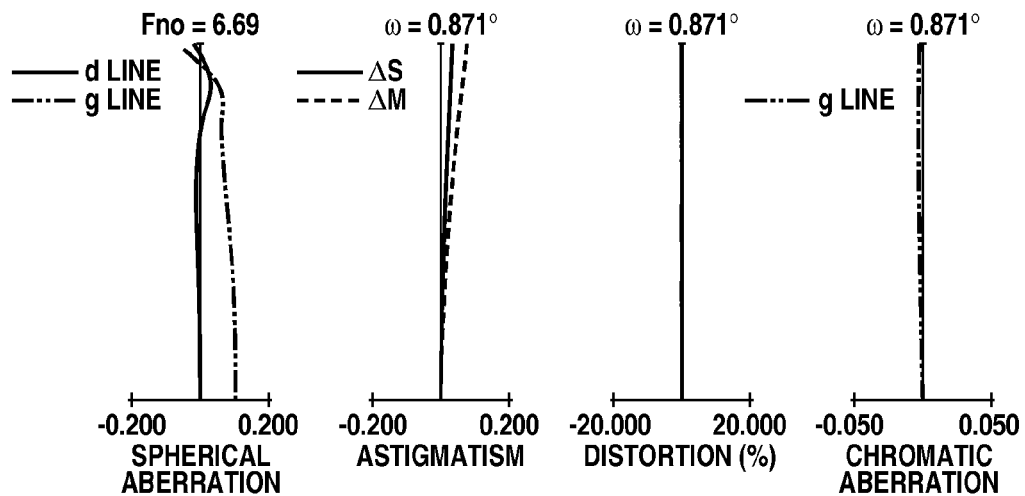

FIG. 1 is a cross-sectional view of a zoom lens of a first exemplary embodiment at a wide-angle end. FIGS. 2A, 2B and 2C illustrate respective aberration diagrams of the zoom lens of the first exemplary embodiment at the wide-angle end, at a middle zoom position, and at a telephoto end. The zoom lens of the first exemplary embodiment has a zoom ratio of 61.21 and an aperture ratio of about 3.50 to 6.69. FIG. 3 is a cross-sectional view of a zoom lens of a second exemplary embodiment at the wide-angle end. FIGS. 4A, 4B and 4C illustrate respective aberration diagrams of the zoom lens of the second exemplary embodiment at the wide-angle end, at the middle zoom position, and at the telephoto end. The zoom lens of the second exemplary embodiment has a zoom ratio of 65.38, and an aperture ratio of about 3.50 to 6.69.

Figure 5:
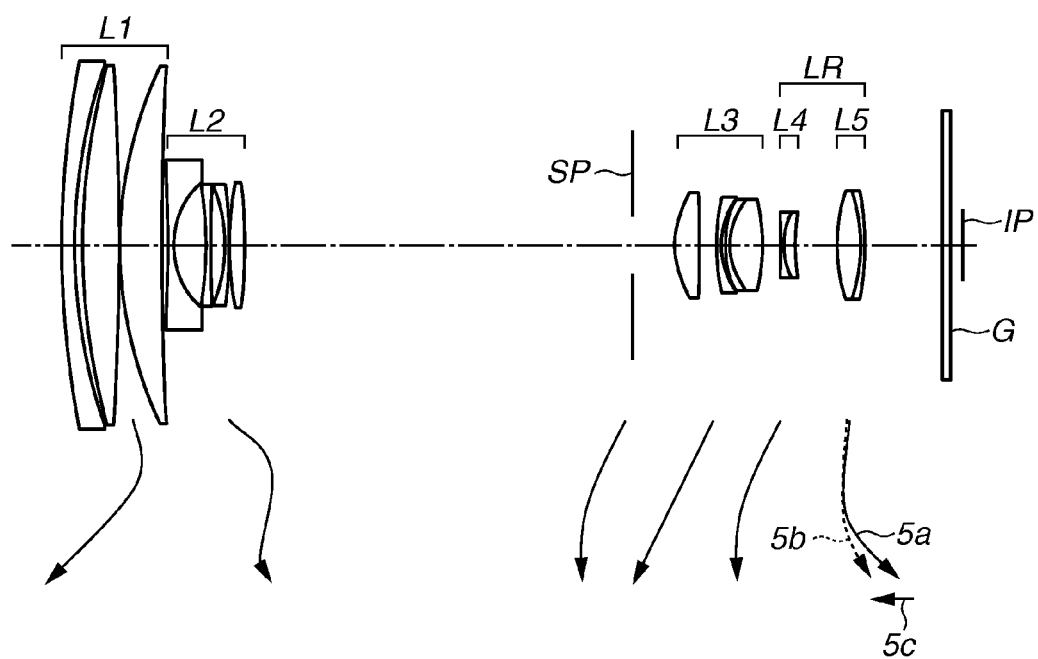
FIG. 5 is a cross-sectional view of a zoom lens at the wide-angle end according to a third exemplary embodiment.

FIG. 5 is a cross-sectional view of a zoom lens of a third exemplary embodiment at the wide-angle end.

Figure 6A:
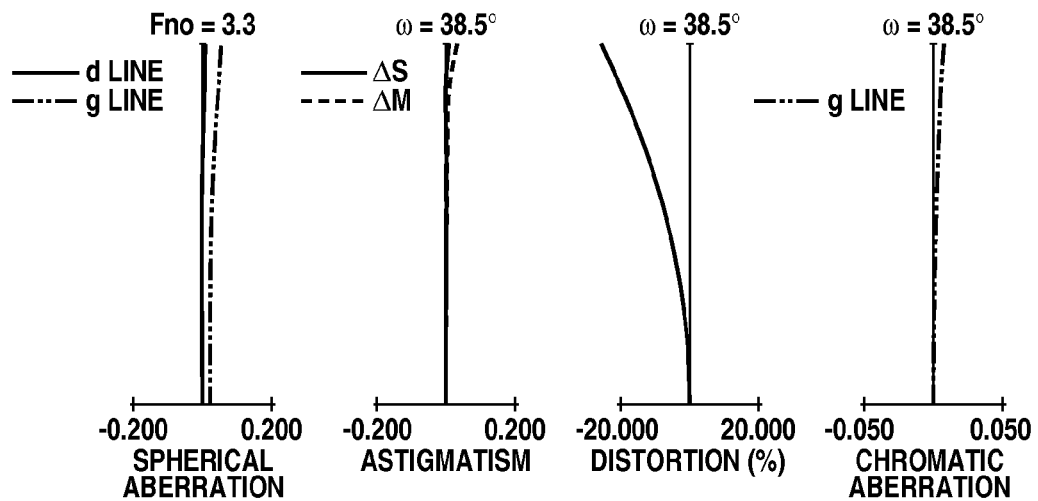
FIGS. 6A to 6C are aberration diagrams of the zoom lens at the wide-angle end, at the middle zoom position, and at the telephoto end according to the third exemplary embodiment.
Figure 6B:
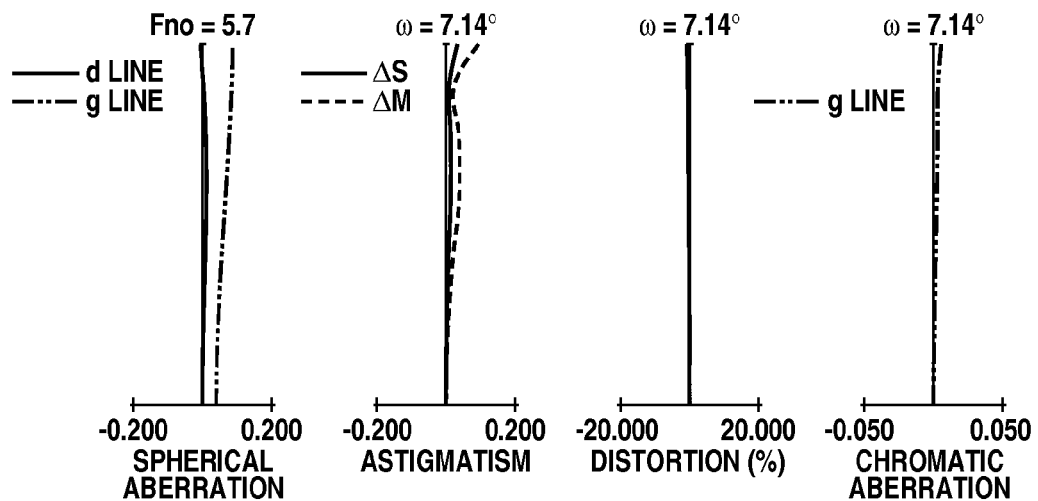
Figure 6C:
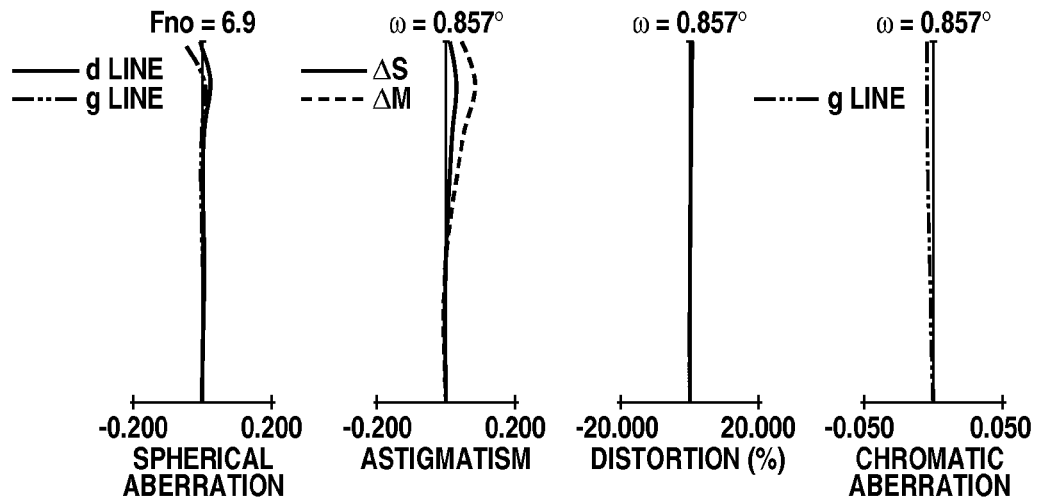
Figure 7:
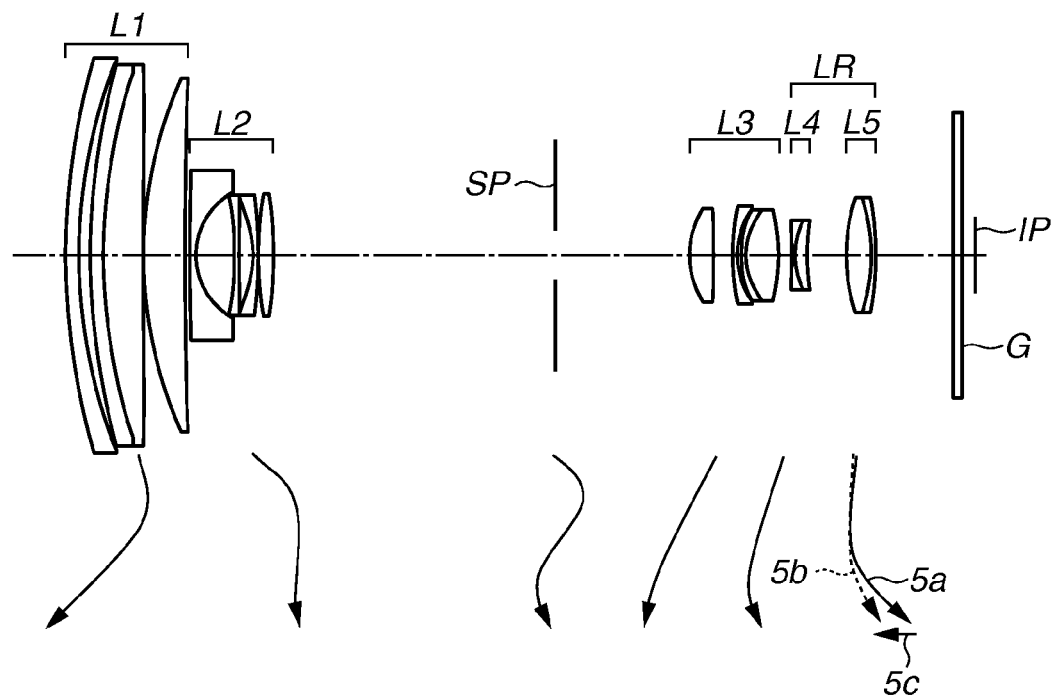
FIG. 7 is a cross-sectional view of a zoom lens at the wide-angle end according to a fourth exemplary embodiment.
Figure 8A:
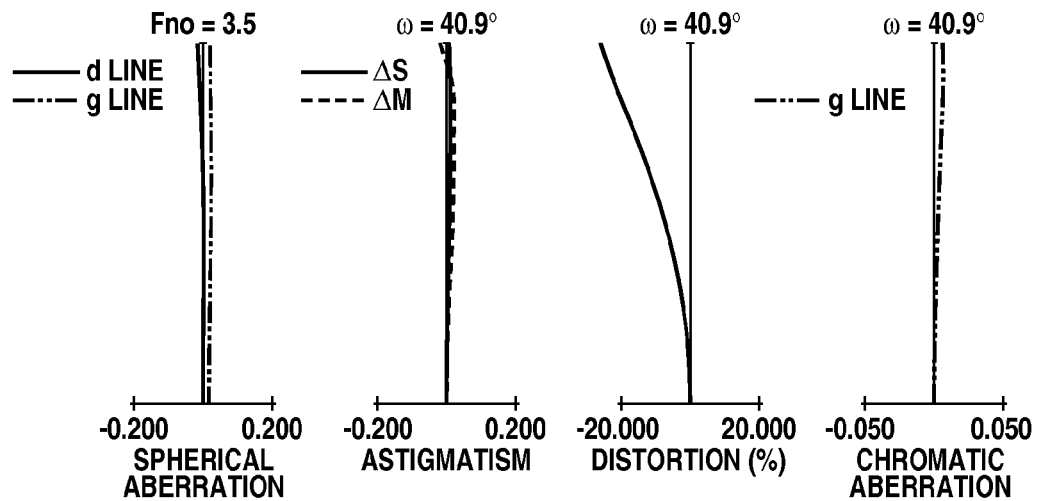
FIGS. 8A to 8C are aberration diagrams of the zoom lens at the wide-angle end, at the middle zoom position, and at the telephoto end according to the fourth exemplary embodiment.
Figure 8B:
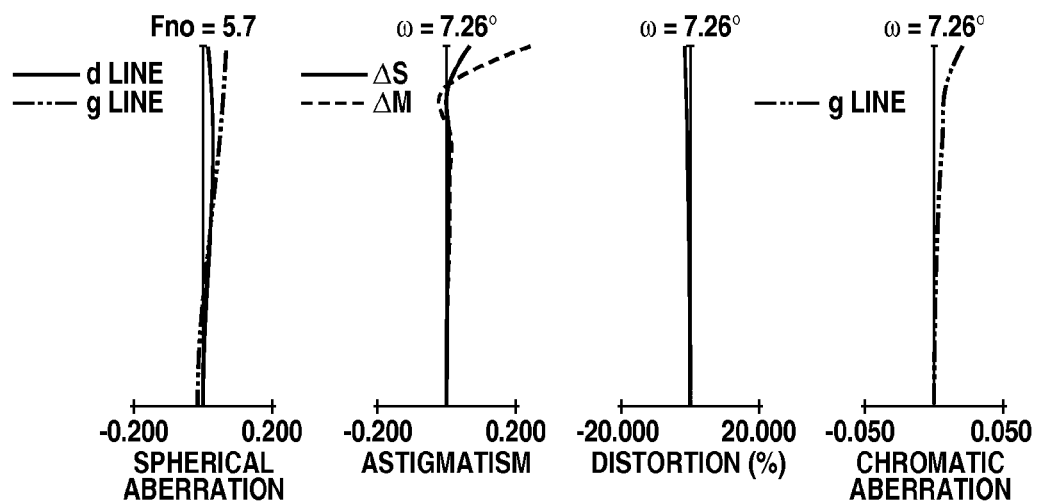
Figure 8C:
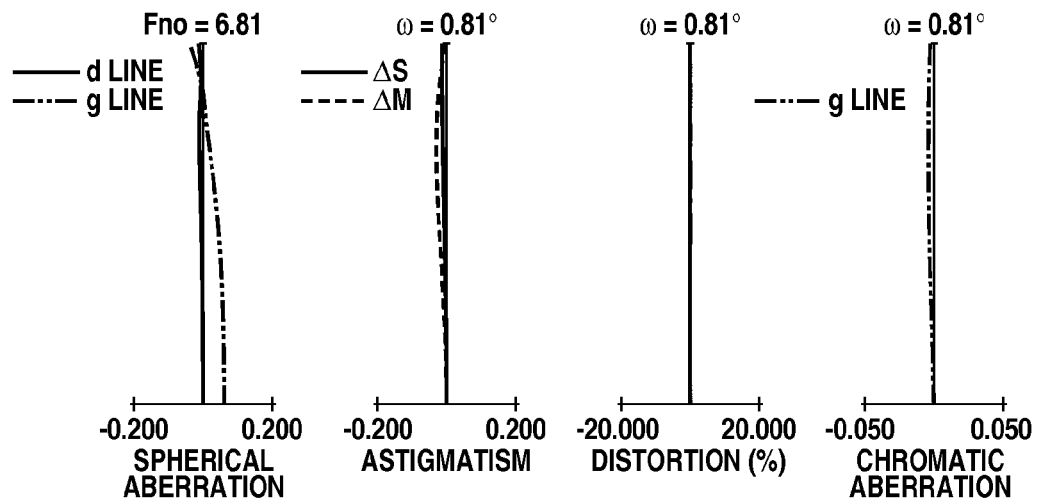

FIGS. 6A, 6B and 6C illustrate respective aberration diagrams of the zoom lens of the third exemplary embodiment at the wide-angle end, at the middle zoom position, and at the telephoto end. The zoom lens of the third exemplary embodiment has a zoom ratio of 70.19, and an aperture ratio of about 3.30 to 6.90. FIG. 7 is a lens cross-sectional view of a zoom lens of a fourth exemplary embodiment at the wide-angle end. FIGS. 8A, 8B and 8C illustrate respective aberration diagrams of the zoom lens of the fourth exemplary embodiment at the wide-angle end, at the middle zoom position, and at the telephoto end. The zoom lens of the fourth exemplary embodiment has a zoom ratio of 81.07, and an aperture ratio of about 3.50 to 6.81.

Figure 9:
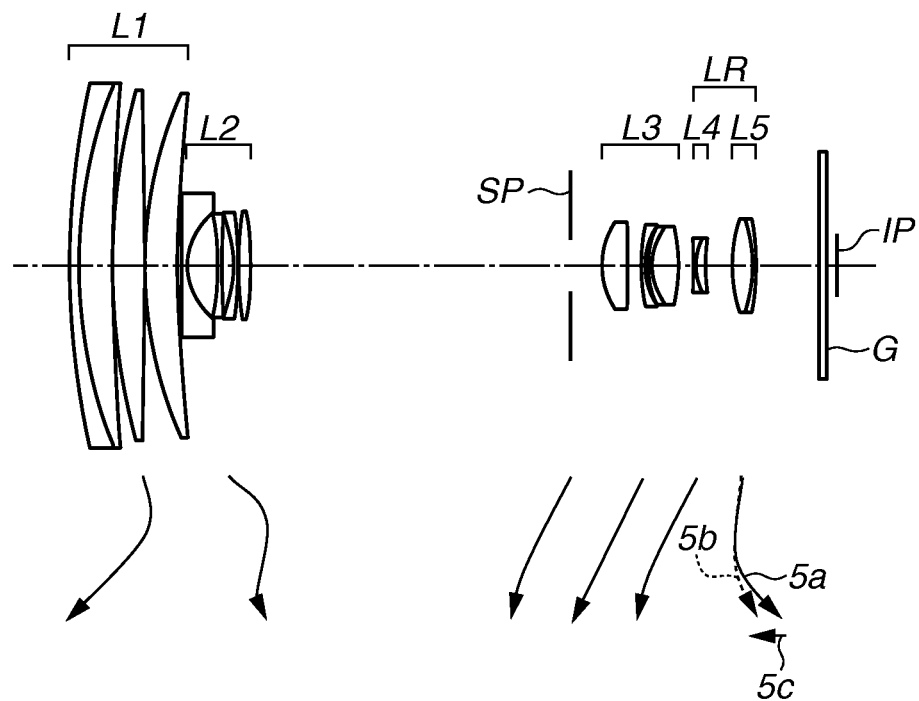
FIG. 9 is a cross-sectional view of a zoom lens at a wide-angle end according to a fifth exemplary embodiment.
Figure 10A:
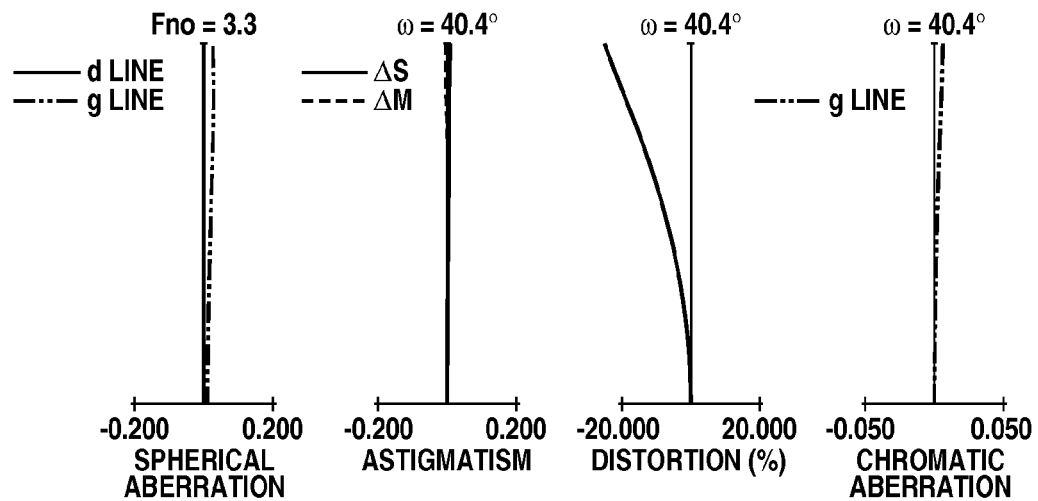
FIGS. 10A to 10C are aberration diagrams of the zoom lens at the wide-angle end, at the middle zoom position, and at the telephoto end according to the fifth exemplary embodiment.
Figure 10B:
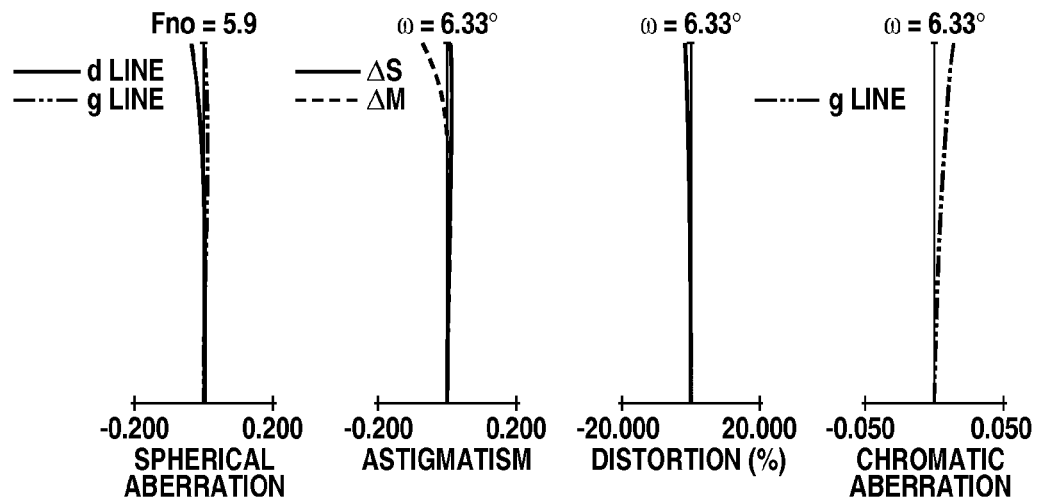
Figure 10C:
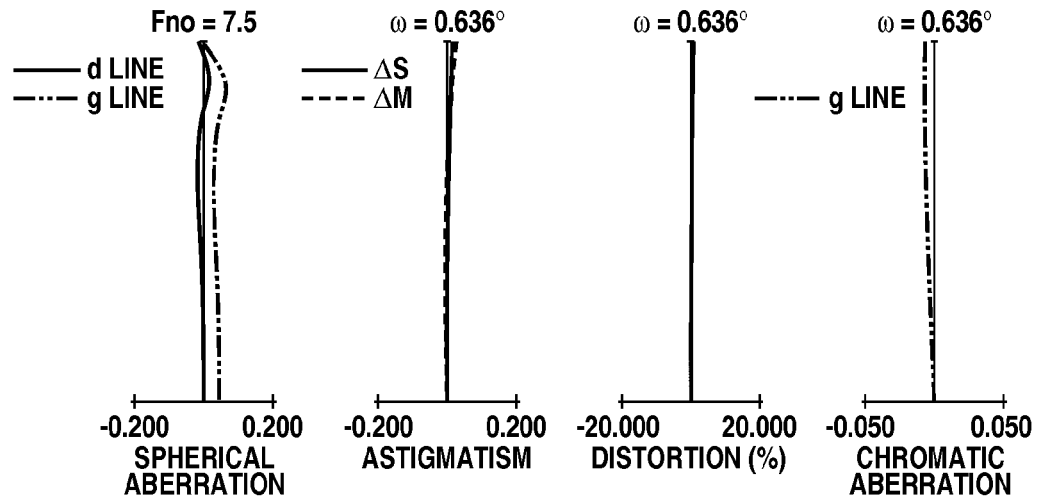
Figure 11:
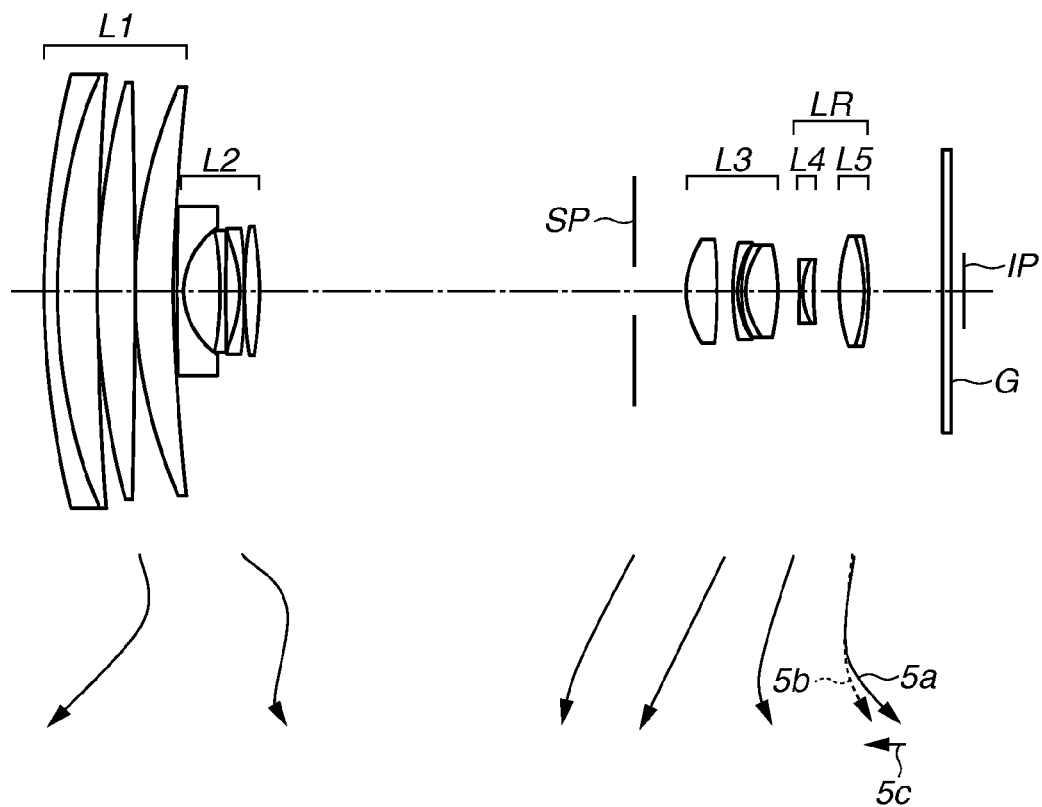
FIG. 11 is a cross-sectional view of a zoom lens at the wide-angle end according to a sixth exemplary embodiment.

FIG. 9 is a cross-sectional view of a zoom lens of a fifth exemplary embodiment at the wide-angle end. FIGS. 10A, 10B and 10C illustrate respective aberration diagrams of the zoom lens of the fifth exemplary embodiment at the wide-angle end, at the middle zoom position, and at the telephoto end. The zoom lens of the fifth exemplary embodiment has a zoom ratio of 99.76, and an aperture ratio of about 3.30 to 7.33. FIG. 11 is a cross-sectional view of a zoom lens of a sixth exemplary embodiment at the wide-angle end. FIGS. 12A, 12B and 12C illustrate respective aberration diagrams of the zoom lens of the sixth exemplary embodiment at the wide-angle end, at the middle zoom position, and at the telephoto end. The zoom lens of the sixth exemplary embodiment has a zoom ratio of 100.00, and an aperture ratio of about 3.30 to 7.30.

Figure 13:
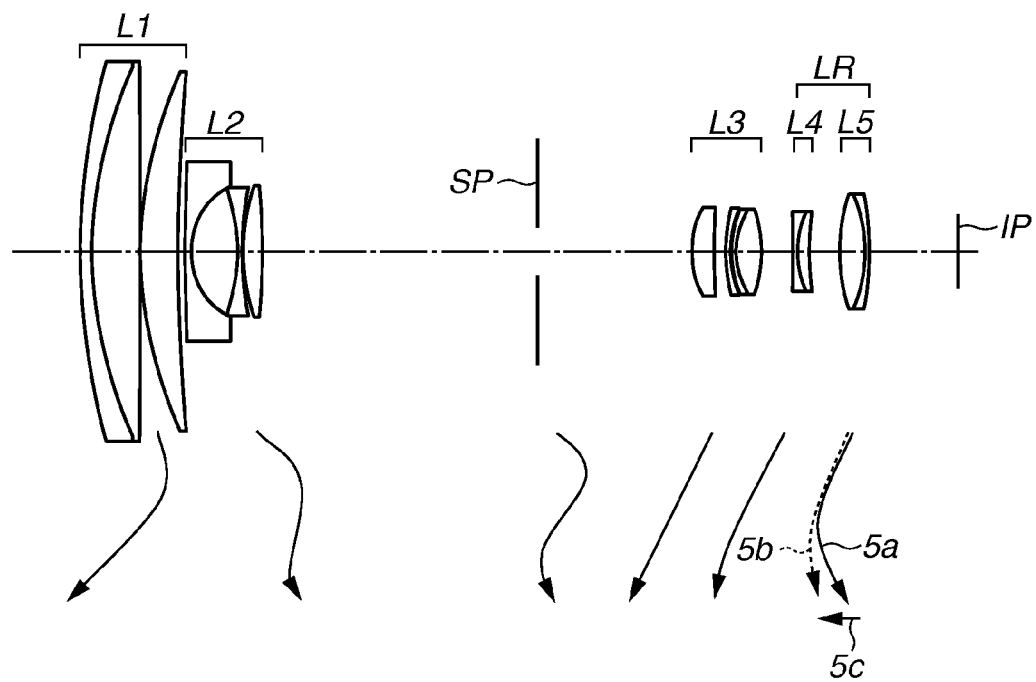
FIG. 13 is a cross-sectional view of a zoom lens at the wide-angle end according to a seventh exemplary embodiment.
Figure 14A:
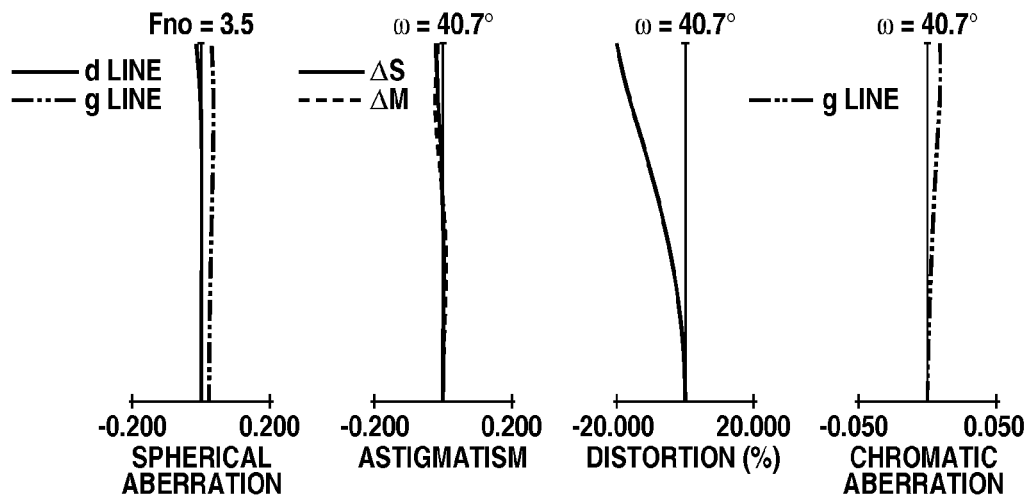
FIGS. 14A to 14C are aberration diagrams of the zoom lens at the wide-angle end, at the middle zoom position, and at the telephoto end according to the seventh exemplary embodiment.
Figure 14B:
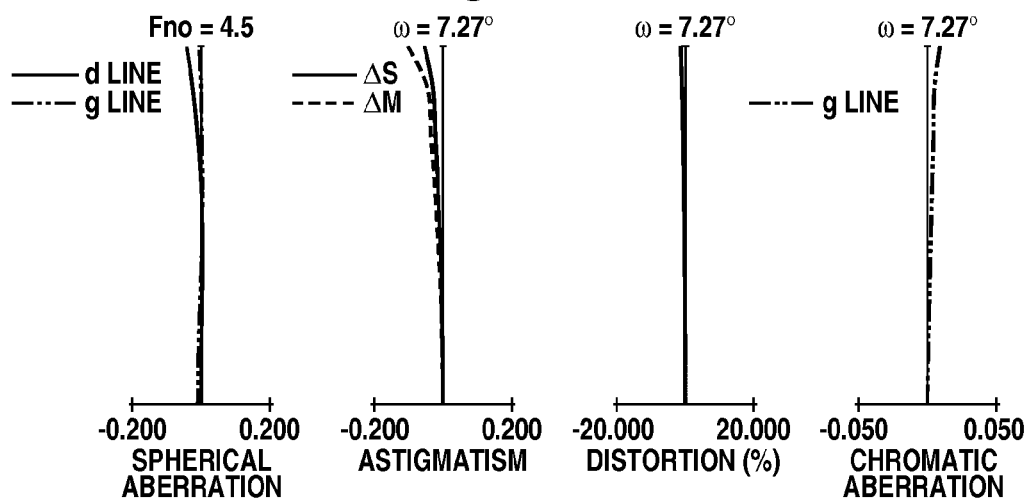
Figure 14C:
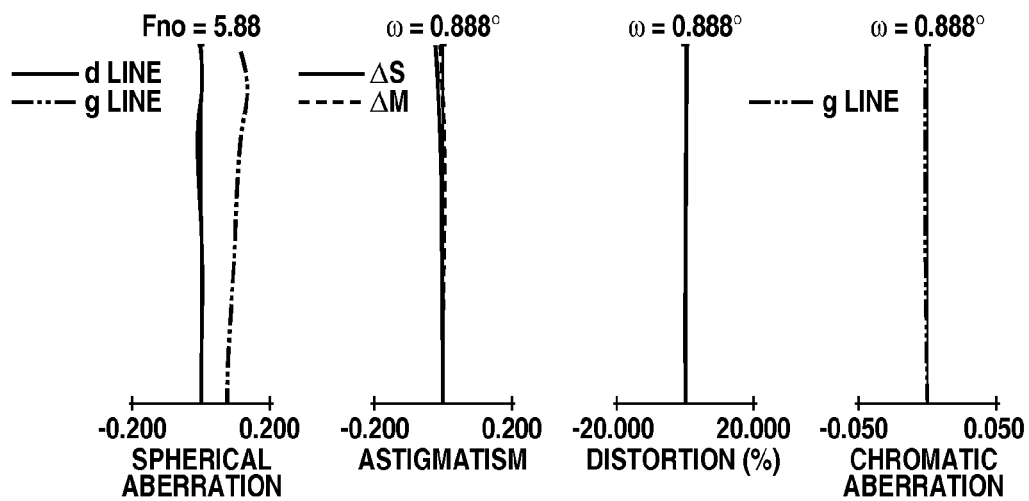
Figure 15:
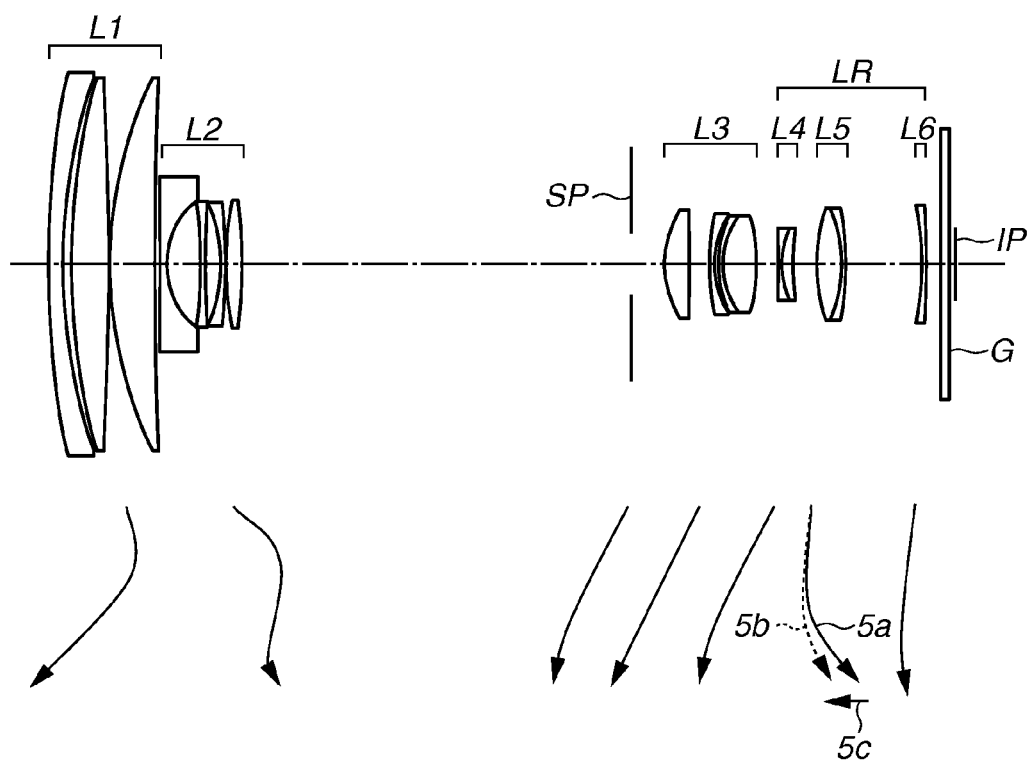
FIG. 15 is a cross-sectional view of a zoom lens at the wide-angle end according to an eighth exemplary embodiment.
Figure 16A:
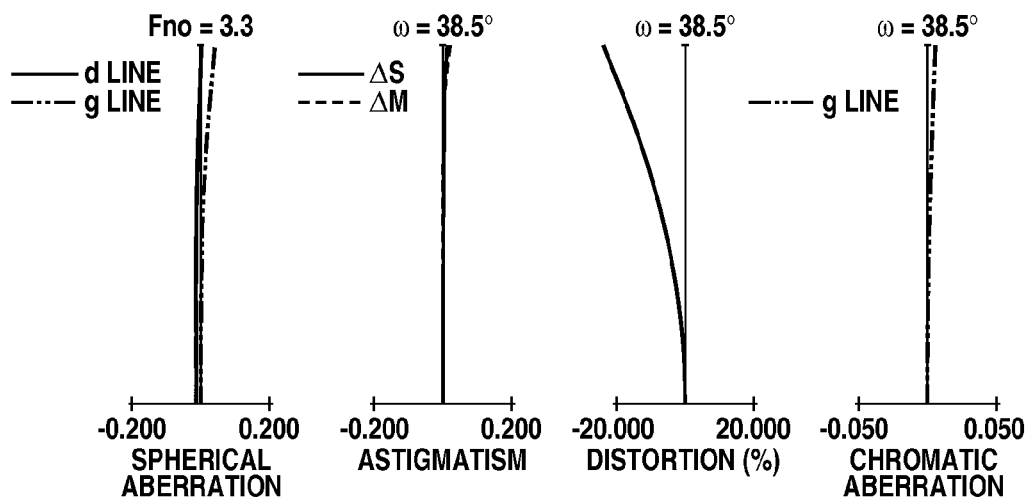
FIGS. 16A to 16C are aberration diagrams of the zoom lens at the wide-angle end, at the middle zoom position, and at the telephoto end according to the eighth exemplary embodiment.
Figure 16B:
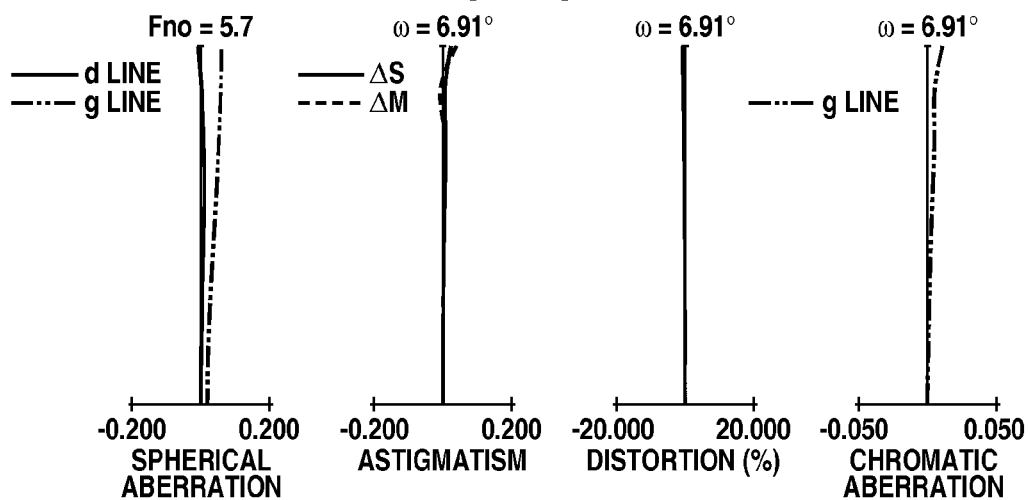
Figure 16C:
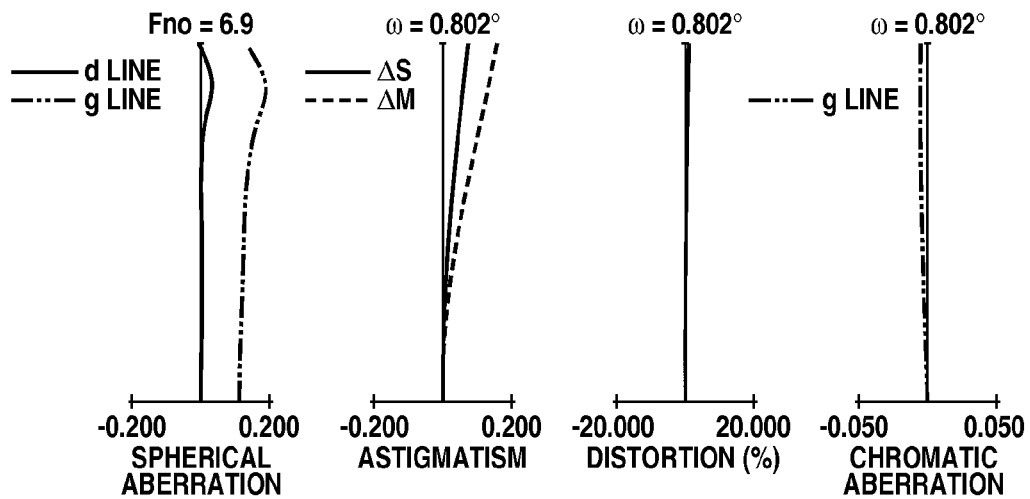

FIG. 13 is a cross-sectional view of a zoom lens of a seventh exemplary embodiment at the wide-angle end. FIGS. 14A, 14B and 14C illustrate respective aberration diagrams of the zoom lens of the seventh exemplary embodiment at the wide-angle end, at the middle zoom position, and at the telephoto end. The zoom lens of the seventh exemplary embodiment has a zoom ratio of 67.75, and an aperture ratio of about 3.50 to 5.88. FIG. 15 is a cross-sectional view of a zoom lens of an eighth exemplary embodiment at the wide-angle end. FIGS. 16A, 16B and 16C illustrate respective aberration diagrams of the zoom lens of the eighth exemplary embodiment at the wide-angle end, at the middle zoom position, and at the telephoto end. The zoom lens of the eighth exemplary embodiment has a zoom ratio of 75.00, and an aperture ratio of about 3.30 to 6.90.

Figure 17:
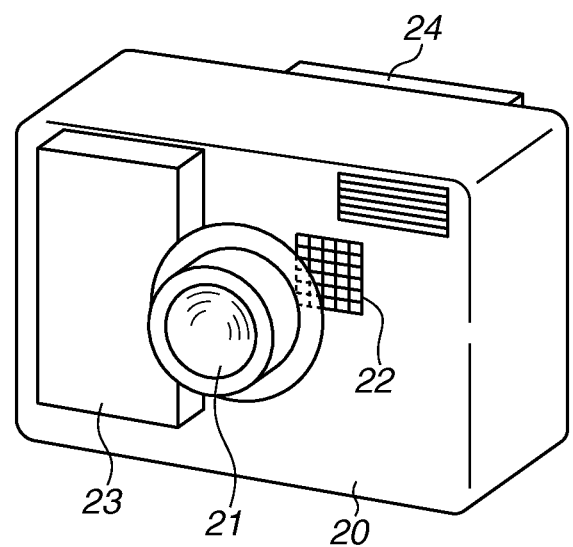
FIG. 17 is a schematic diagram of principal parts of an image pickup apparatus according to the present invention.

FIG. 17 is a schematic diagram of principal parts of a digital still camera (image pickup apparatus) including a zoom lens of an exemplary embodiment of the present invention. The zoom lens of each exemplary embodiment is a photographic lens system used for image pickup apparatuses such as a video camera, a digital still camera, a silver-halide film camera, and a television camera. In the lens cross-sectional view, the left side is the object side (front side), and the right side is the image side (rear side). Further, in the lens cross-sectional view, Li represents the i-th lens unit where i is an order of the lens units from the object side to the image side.

The zoom lenses of the first to seventh exemplary embodiments consist of, in order from the object side to the image side, a first lens unit L1 having positive refractive power, a second lens unit L2 having negative refractive power, a third lens unit L3 having positive refractive power, a fourth lens unit L4 having negative refractive power, and a fifth lens unit L5 having positive refractive power. The zoom lenses of the first to seventh exemplary embodiments are positive lead-type five-unit zoom lens made of five lens units. In the first to seventh exemplary embodiments, among the five lens units, the rear lens groups consist of the fourth lens unit L4 having negative refractive power and the fifth lens unit L5 having positive refractive power.

The zoom lens of the eighth exemplary embodiment consists of, in order from the object side to the image side, a first lens unit L1 having positive refractive power, a second lens unit L2 having negative refractive power, a third lens unit L3 having positive refractive power, a fourth lens unit L4 having positive refractive power, a fifth lens unit L5 having positive refractive power, and a sixth lens unit L6 having negative refractive power. That is, the zoom lens of the eighth exemplary embodiment is a positive lead-type six-unit zoom lens made of six lens units. In the eight embodiment, among the six lens units, the rear lens group consists of the fourth lens unit L4 having negative refractive power, the fifth lens unit L5 having positive refractive power, and the sixth lens unit L6 having negative refractive power.

In each exemplary embodiment, SP represents an aperture stop, and the aperture stop SP is arranged between the second lens unit L2 and the third lens unit L3. In zooming from the wide-angle end to the telephoto end, the aperture stop SP is moved along a locus different from the lens units to be positioned closer to the object side at the telephoto end than at the wide-angle end. Accordingly, an entrance pupil position can be moved to the object side. Therefore, a decrease in an effective diameter of the front lens can be achieved.

An optical block G corresponds to an optical filter, a face plate, a low-pass filter, an infrared cut filter, or the like. IP represents an image plane. The image plane IP corresponds to a solid-state image sensor (photoelectric conversion element) such as a charge-coupled device (CCD) sensor or a complementary metal-oxide semiconductor (CMOS) sensor when the zoom lens is used as a photographic optical system of a video camera or a digital camera. The image plane IP corresponds to a film plane when the zoom lens is used as a photographic optical system of a silver-halide film camera.

In the spherical aberration diagrams, Fno represents F-number, and the spherical aberration diagram illustrates spherical aberration based on a d line (wavelength 587.6 nm) and a g line (wave length 435.8 nm). In the astigmatism diagram, ΔS represents a sagittal image plane and ΔM represents a meridional image plane. Distortion indicates distortion about the d line. The chromatic aberration diagram illustrates chromatic aberration of the g line. ω represents an image half field angle.

In each exemplary embodiment, as illustrated by the arrows in the lens cross-sectional view, in zooming from the wide-angle end to the telephoto end, the lens units are moved and therefore distances between adjacent lens units are changed. More specifically, in each exemplary embodiment, in zooming from the wide-angle end to the telephoto end, the first lens unit L1 is moved to draw a convex locus as seen from the image side. The second lens unit L2 is moved to be positioned closer to the image side at the telephoto end than at the wide-angle end. The third lens unit L3 is moved to be positioned closer to the object side at the telephoto end than at the wide-angle end. The fourth lens unit L4 is moved to be positioned closer to the object side at the telephoto end than at the wide-angle end. The fifth lens unit L5 is moved to be positioned closer to the image side at the telephoto end than at the wide-angle end. As for the zoom lenses of the eighth exemplary embodiment (FIG. 15), the sixth lens unit L6 is moved to the object side in zooming from the wide-angle end to the telephoto end.

In each exemplary embodiment, two or more lens units among the lens units included in the rear lens group are moved in zooming from the wide-angle end to the telephoto end. Accordingly, variable power in the rear lens group can be increased, and high magnification of the zoom lens can be easily achieved.

In each exemplary embodiment, a desired magnification varying power of the second lens unit L2 is relatively large. Accordingly, high magnification can be realized without increasing a moving distance of the first lens unit L1 to the object side, at the telephoto end. Further, the refractive power of the second lens unit L2 is made relatively large, so that an increase in the wide angle is realized.

Further, in each exemplary embodiment, the aperture stop SP is moved in a locus different from the lens units in zooming in such a manner that the distance between the aperture stop SP and the third lens unit L3 can be smaller at the telephoto end than at the wide-angle end. Accordingly, the entrance pupil position can be moved to the object side. Therefore, incident height of an off-axis ray that passes through the first lens unit L1 and the second lens unit L2 can be made small. As a result, the effective diameter of the front lens can be decreased.

In the eighth exemplary embodiment, the sixth lens unit L6 is moved to the object side in zooming, so that curvature of field can favorably corrected in the entire zoom range.

Further, in each exemplary embodiment, the fifth lens unit L5 is used as a focus lens unit. In each exemplary embodiment, when focusing is performed from an infinite-distance object to a near-distance object at the telephoto end, the fifth lens unit L5 is moved to the object side, as illustrated by the arrow 5c in the lens cross section. The solid line 5a and the dotted line 5b illustrate respective moving loci for correcting image plane variation associated with the zooming from the wide-angle end to the telephoto end when focusing on the infinite-distance object and the near-distance object.

Further, in each exemplary embodiment, a part or the entire third lens unit L3 is moved to have a component in a direction perpendicular to an optical axis, so that image shake correction is performed.

The zoom lens of each exemplary embodiment satisfies the following conditional equations:

$$12.00 < M1/fw < 23.00 \tag{1}$$

$$-18.00 < ft/frn < -8.30 \tag{2}$$

Here, an amount of movement of the first lens unit L1 on the optical axis in zooming from the wide-angle end to the telephoto end is defined as M1, a focal length of the entire zoom lens at the wide-angle end is fw, and a focal length of the entire zoom lens at the telephoto end is defined as ft. Further, a focal length of a lens unit Lrn having the largest refractive power among the lens units having negative refractive power included in the rear lens group is defined as frn. Here, when the lens unit having negative refractive power included in the rear lens group is 1, the lens unit corresponds to the lens unit Lrn. Here, the amount of movement is a difference of positions of each lens unit on the optical axis at the wide-angle end and at the telephoto end, and the sign of the amount of movement is positive when the lens unit is positioned closer to the object side at the telephoto end than at the wide-angle end, and is negative when the lens unit is positioned closer to the image side at the telephoto end than at the wide-angle end.

Conditional equation (1) defines a ratio of the focal length fw of the entire zoom lens at the wide-angle end, and the amount of movement M1 of the first lens unit L1 in zooming from the wide-angle end to the telephoto end.

If the amount of movement M1 of the first lens unit L1 becomes large beyond a maximum value of Conditional equation (1), the overall lens length at the telephoto end is increased, and thus it is not favorable. Further, to sufficiently secure a peripheral light quantity, the effective diameter of the front lens is increased.

If the amount of movement M1 of the first lens unit L1 becomes small below a minimum value of Conditional equation (1), it becomes necessary to increase the refractive power of the first lens unit L1 to realize high magnification. As a result, a lot of chromatic aberration is generated in the first lens unit, and thus it is not favorable.

Conditional equation (2) defines a ratio of the focal length frn of the lens unit Lrn, and the focal length ft of the entire zoom lens at the telephoto end.

If the focal length frn of the lens unit Lrn becomes large beyond a maximum value of Conditional equation (2), the refractive power of the lens unit Lrn becomes too small. As a result, the variable power in the rear lens group becomes small, and it becomes difficult to realize high magnification as the entire zoom lens, and thus it is not favorable.

If the focal length frn of the lens unit Lrn becomes small below a minimum value of Conditional equation (2), the refractive power of the lens unit Lrn becomes too large. As a result, it becomes difficult to sufficiently correct various types of aberration caused in the rear lens group, and thus it is not favorable.

In each exemplary embodiment, numerical ranges of Conditional equations (1) and (2) are favorably set as follows:

$$12.50 < M1/fw < 22.00 \tag{1a}$$

$$-17.50 < ft/frn < -8.30 \tag{2a}$$

Further, the numerical ranges of Conditional equations (1) and (2) are more favorably set as follows:

$$13.00 < M1/fw < 21.00 \tag{1b}$$

$$-17.00 < ft/frn < -8.30 \tag{2b}$$

Further, in each exemplary embodiment, it is favorable to satisfy one or more conditional equations below:

$$0.20 < f1/ft < 0.50 \tag{3}$$

$$-15.00 < f1/f2 < -9.00 \tag{4}$$

$$1.30 < \beta rt/\beta rw < 2.50 \tag{5}$$

$$20.00 < f1/fw < 38.00 \tag{6}$$

$$0.025 < Mrn/ft < 0.075 \tag{7}$$

$$1.400 < Ndavelp < 1.520 \quad (8)$$

$$75.00 < vdavelp < 100.00 \quad (9)$$

$$-0.100 < M2/ft < -0.025 \quad (10)$$

Here, a focal length of the first lens unit L1 is defined as f1, a focal length of the second lens unit L2 is defined as f2, a lateral magnification of the entire rear lens group at the wide-angle end is defined as βrw, a lateral magnification of the entire rear lens group at the telephoto end is defined as βrt, and the amount of movement of the second lens unit L2 in zooming is defined as M2. Further, the amount of movement of the lens unit Lrn in zooming is Mrn, an average value of refractive indexes of materials of positive lenses included in the first lens unit L1 based on the d line is defined as Ndavelp, and an average value of Abbe numbers is defined as vdavelp.

If the focal length f1 of the first lens unit L1 becomes large beyond a maximum value of Conditional equation (3), the refractive power of the first lens unit L1 becomes too small. As a result, it becomes necessary to increase the amount of movement M1 of the first lens unit L1 in zooming to realize high magnification, and the overall lens length is increased. Therefore, it is not favorable.

If the focal length f1 of the first lens unit L1 becomes small below a minimum value of Conditional equation (3), the refractive power of the first lens unit L1 becomes too large. As a result, chromatic aberration generated in the first lens unit L1 at the telephoto end is increased, and thus it is not favorable.

If the focal length f1 of the first lens unit L1 becomes small beyond a maximum value of Conditional equation (4), the refractive power of the first lens unit L1 becomes too large. As a result, chromatic aberration generated in the first lens unit L1 at the telephoto end is increased, and thus it is not favorable. Further, if the focal length f2 of the second lens unit L2 becomes large beyond the maximum value of Conditional equation (4), the refractive power of the second lens unit L2 becomes too small. As a result, the variable power of the second lens unit L2 becomes small, and it becomes difficult to realize high magnification. Therefore, it is not favorable.

If the focal length f1 of the first lens unit L1 becomes large below a minimum value of Conditional equation (4), the refractive power of the first lens unit L1 becomes too small. As a result, it becomes necessary to increase the amount of movement M1 of the first lens unit L1 in zooming to realize high magnification, and the overall lens length is increased. Therefore, it is not favorable. Further, if the focal length f2 of the second lens unit L2 becomes small below the minimum value of Conditional equation (4), the refractive power of the second lens unit L2 becomes too large. As a result, the curvature of field is increased, and thus it is not favorable.

If magnification varying power of the rear lens group becomes large beyond a maximum value of Conditional equation (5), various types of aberration generated in the rear lens group are increased, and it becomes necessary to increase the number of lenses that constitute the rear lens group to correct such aberration. As a result, the overall lens length is increased, and thus it is not favorable.

If the magnification varying power of the rear lens group becomes small below a minimum value of Conditional equation (5), it becomes necessary to increase magnification varying power of the second lens unit L2 or the third lens unit L3 to realize high magnification. If the magnification varying power of the second lens unit L2 becomes too large, the curvature of field is increased, and thus it is not favorable. Further, if the magnification varying power of the third lens unit L3 becomes too large, a lot of spherical aberration and on-axis chromatic aberration are generated, and thus it is not favorable.

If the focal length f1 of the first lens unit L1 becomes large beyond a maximum value of Conditional equation (6), the refractive power of the first lens unit L1 becomes too small. As a result, it becomes necessary to increase the amount of movement M1 of the first lens unit L1 in zooming to realize high magnification, and the overall lens length is increased. Therefore, it is not favorable.

If the focal length f1 of the first lens unit L1 becomes small below a minimum value of Conditional equation (6), the refractive power of the first lens unit L1 becomes too large. As a result, it becomes difficult to sufficiently secure the peripheral light quantity at the wide-angle end, and thus it is not favorable. Further, if the focal length fw of the entire zoom lens at the wide-angle end becomes large below the minimum value of Conditional equation (6), it becomes difficult to realize high magnification, and thus it is not favorable.

If the amount of movement Mrn of the lens unit Lrn becomes large beyond a maximum value of Conditional equation (7), the distance between the lens unit Lrn, and the lens unit arranged at the object side of the lens unit Lrn becomes small at the telephoto end, and the variable power of the rear lens group becomes small. As a result, it becomes difficult to realize high magnification, and thus it is not favorable.

If the amount of movement Mrn of the lens unit Lrn becomes small below a minimum value of Conditional equation (7), the distance between the lens unit Lrn, and the lens unit arranged at the object side of the lens unit Lrn becomes large at the telephoto end, and the overall lens length is increased. Therefore, it is not favorable.

Conditional equations (8) and (9) define the materials of the positive lenses included in the first lens unit L1.

If the average value Ndavelp of refractive indexes based on the d line, of the materials of the positive lenses included in the first lens unit L1 becomes large beyond a maximum value of Conditional equation (8), materials selectable within a range satisfying Conditional equation (9) become limited, and thus it is not favorable.

If the average value Ndavelp of refractive indexes based on the d line, of the materials of the positive lenses included in the first lens unit L1 becomes small below a minimum value of Conditional equation (8), it becomes necessary to increase curvatures of the positive lenses included in the first lens unit L1 to keep the positive refractive power. As a result, a lot of comas are generated at the telephoto end, and thus it is not favorable.

If the average value vdavelp of Abbe numbers of the materials of the positive lenses included in the first lens unit L1 becomes large beyond a maximum value of Conditional equation (9), materials selectable within a range satisfying Conditional equation (8) become limited, and thus it is not favorable.

If the average value vdavelp of Abbe numbers of the materials of the positive lenses included in the first lens unit L1 becomes small below a minimum value of Conditional equation (9), it becomes difficult to sufficiently correct the on-axis chromatic aberration at the telephoto end, and thus it is not favorable.

If the amount of movement M2 of the second lens unit L2 becomes large below a minimum value of Conditional equation (10), the overall lens length at the wide-angle end is increased, and thus it is not favorable.

If the amount of movement M2 of the second lens unit L2 becomes small beyond a maximum value of Conditional equation (10), it becomes necessary to increase the refractive power of the second lens unit L2 to realize high magnification. As a result, it becomes difficult to sufficiently correct the curvature of field, and thus it is not favorable.

Numerical ranges of Conditional equations (3) to (10) are favorably set as follows:

$$0.23 < f1/ft < 0.45 \tag{3a}$$

$$-14.50 < f1/f2 < -9.50 \tag{4a}$$

$$1.33 < \beta rt/\beta rw < 2.20 \tag{5a}$$

$$21.00 < f1/fw < 35.00 \tag{6a}$$

$$0.032 < Mrn/ft < 0.073 \tag{7a}$$

$$1.410 < Ndavelp < 1.510 \tag{8a}$$

$$78.00 < vdavelp < 98.00 \tag{9a}$$

$$-0.095 < M2/ft < -0.030 \tag{10a}$$

The numerical ranges of Conditional equations (3) to (10) are more favorably set as follows:

$$0.25 < f1/ft < 0.40 \tag{3b}$$

$$-13.00 < f1/f2 < -10.00 \tag{4b}$$

$$1.35 < \beta rt/\beta rw < 2.00 \tag{5b}$$

$$22.00 < f1/fw < 32.00 \tag{6b}$$

$$0.040 < Mrn/ft < 0.070 \tag{7b}$$

$$1.420 < Ndavelp < 1.500 \tag{8b}$$

$$80.00 < vdavelp < 95.00 \tag{9b}$$

$$-0.090 < M2/ft < -0.035 \tag{10b}$$

Next, configurations of the respective lens units will be described. In the zoom lenses of the first to third, seventh, and eighth exemplary embodiments, the first lens units L1 are made of, in order from the object side to the image side, a negative lens, a positive lens, and a positive lens. In the zoom lenses of the fifth and sixth exemplary embodiments, the first lens units L1 are made of, in order from the object side to the image side, a negative lens, a positive lens, a positive lens, and a positive lens. In the zoom lens of the fourth exemplary embodiment, the first lens unit L1 is made of, in order from the object side to the image side, a negative lens, a negative lens, a positive lens, and a positive lens.

The first lens unit L1 is configured to include one or more positive lenses and one or more negative lenses, whereby the chromatic aberration at the telephoto end can be favorably corrected.

In the zoom lenses of the first to sixth, and eighth exemplary embodiments, the second lens units L2 are made of, in order from the object side to the image side, a negative lens, a negative lens, a negative lens, and a positive lens. In the zoom lens of the seventh exemplary embodiment, the second lens unit L2 is made of, in order from the object side to the image side, a negative lens, a negative lens, and a positive lens. The second lens unit L2 is configured to include at least two negative lenses, and a positive lens, whereby the curvature of field and the magnification chromatic aberration at the wide-angle end can be favorably corrected.

In each exemplary embodiment, the third lens unit L3 is made of, in order from the object side to the image side, a positive lens, a negative lens, and a cemented lens that is a cemented negative lens and positive lens. Such a lens configuration is obtained by adding of one lens to a triplet-type lens configuration, and is called Tesaar-type configuration. In each exemplary embodiment, the Tesaar-type configuration is employed as the configuration of the third lens unit, whereby the Petzval sum can be simply and easily adjusted, and the curvature of field can be favorably corrected in the entire zoom range.

In each exemplary embodiment, the fourth lens unit L4 is made of, in order from the object side to the image side, a negative lens and a positive lens, and the negative lens and the positive lens constitute a cemented lens. The fourth lens unit L4 is configured to include one positive lens and one negative lens, whereby the chromatic aberration generated in the fourth lens unit L4 can be favorably corrected without increasing the number of lenses.

In each exemplary embodiment, the fifth lens unit L5 is made of, in order from the object side to the image side, a positive lens and a negative lens, and the positive lens and the negative lens constitute the cemented lens. The fifth lens unit L5 is configured to include one positive lens and one negative lens, whereby the chromatic aberration generated in the fifth lens unit L5 can be favorably corrected without increasing the number of lenses.

Further, in the eighth exemplary embodiment, the sixth lens unit L6 is made of one negative lens.

Next, first to eighth numerical examples respectively corresponding to the first to eighth exemplary embodiments of the present invention will be described. In each numerical example, i represents an order of optical surfaces from the object side. ri represents a curvature radius of the i-th optical surface (the i-th surface), di represents the distance between the i-th surface and the (i+1)-th surface, ndi and vdi respectively represent a refractive index and Abbe number of the material of the i-th optical member based on the d line.

Further, an aspherical shape is expressed by:

$$x = (h^2/R)/[1+[1-(1+K)(h/R)^2]^{1/2}] + A4h^4 + A6h^6 + A8h^8$$

where K is eccentricity, A4, A6, and A8 are aspheric coefficients, and a displacement in the optical axis direction at a position having a height h from the optical axis based on a surface vertex is x. In the numerical examples below, aspherical surfaces are denoted with an asterisk ("*"), R is a paraxial curvature radius, and the expression "e-Z" corresponds to the exponential notation "$10^{-z}$".

In each exemplary embodiment, back focus (BF) expresses a distance from a surface closest to the image side in the lens system to the image plane, in air conversion length. Further, correspondence between the respective numerical examples and the above-described conditional equations is illustrated in Table 1.

Note that an effective image circle diameter (a diameter of an image circle) at the wide-angle end can be made smaller than that at the telephoto end. This is because barrel-type distortion, which is more likely to be generated at the wide angle side, can be corrected by enlarging of an image by image processing.

FIRST NUMERICAL EXAMPLE

Unit mm

Surface Data

| Surface Number | r | d | nd | νd |
|---|---|---|---|---|
| 1 | 92.694 | 1.50 | 1.91082 | 35.3 |
| 2 | 51.880 | 5.37 | 1.49700 | 81.5 |
| 3 | −352.628 | 0.05 | | |
| 4 | 47.383 | 4.03 | 1.49700 | 81.5 |
| 5 | 227.889 | (variable) | | |
| 6 | 254.189 | 0.70 | 1.83481 | 42.7 |
| 7 | 8.179 | 3.90 | | |
| 8 | −69.344 | 0.55 | 1.80400 | 46.6 |
| 9 | 69.344 | 1.35 | | |
| 10 | −26.448 | 0.55 | 1.83481 | 42.7 |
| 11 | 124.436 | 0.05 | | |
| 12 | 24.466 | 1.71 | 1.95906 | 17.5 |
| 13 | −190.981 | (variable) | | |
| 14 (stop) | ∞ | (variable) | | |
| 15* | 9.650 | 2.85 | 1.55332 | 71.7 |
| 16* | −59.993 | 1.69 | | |
| 17 | 28.170 | 0.50 | 1.77250 | 49.6 |
| 18 | 9.203 | 0.52 | | |
| 19 | 12.064 | 0.50 | 1.80518 | 25.4 |
| 20 | 8.364 | 3.79 | 1.49700 | 81.5 |
| 21 | −22.277 | (variable) | | |
| 22 | −139.087 | 0.35 | 1.77250 | 49.6 |
| 23 | 8.370 | 1.36 | 1.68893 | 31.1 |
| 24 | 26.638 | (variable) | | |
| 25 | 20.410 | 2.76 | 1.65844 | 50.9 |
| 26 | −19.710 | 0.46 | 1.95906 | 17.5 |
| 27 | −36.854 | (variable) | | |
| 28 | ∞ | 1.00 | 1.51633 | 64.1 |
| 29 | ∞ | 1.40 | | |
| Image Plane | ∞ | | | |

Aspheric Surface Data

15th surface

K = 0.00000e+000 A4 = −1.05773e−004 A6 = −2.88334e−006 A8 = −3.31303e−008

16th surface

K = 0.00000e+000 A4 = 3.98179e−005 A6 = −3.82062e−006

Various Data
Zoom Ratio 61.21

| | Wide Angle | Middle | Telephoto |
|---|---|---|---|
| Focal Length | 3.91 | 30.61 | 239.59 |
| F-number | 3.50 | 5.70 | 6.69 |
| Half Field Angle | 39.07 | 7.21 | 0.93 |
| Image Height | 3.18 | 3.88 | 3.88 |
| Overall Lens Length | 97.23 | 129.86 | 148.23 |
| BF | 11.06 | 18.18 | 9.53 |
| d5 | 0.75 | 42.64 | 67.27 |
| d13 | 33.13 | 7.03 | 0.63 |
| d14 | 12.42 | 5.29 | 0.46 |
| d21 | 2.10 | 8.67 | 14.85 |
| d24 | 3.22 | 13.51 | 20.95 |
| d27 | 9.00 | 16.12 | 7.47 |

Zoom Lens Unit Data

| Unit | Start Surface | Focal Length |
|---|---|---|
| 1 | 1 | 86.46 |
| 2 | 6 | −8.43 |
| 3 | 15 | 16.66 |
| 4 | 22 | −23.94 |
| 5 | 25 | 23.62 |

SECOND NUMERICAL EXAMPLE

Unit mm

Surface Data

| Surface Number | r | d | nd | νd |
|---|---|---|---|---|
| 1 | 93.232 | 1.40 | 1.91082 | 35.3 |
| 2 | 52.771 | 5.37 | 1.49700 | 81.5 |
| 3 | −420.406 | 0.05 | | |
| 4 | 48.381 | 4.03 | 1.49700 | 81.5 |
| 5 | 216.694 | (variable) | | |
| 6 | 229.850 | 0.70 | 1.83481 | 42.7 |
| 7 | 8.332 | 3.90 | | |
| 8 | −70.021 | 0.55 | 1.80400 | 46.6 |
| 9 | 70.021 | 1.35 | | |
| 10 | −24.945 | 0.55 | 1.83481 | 42.7 |
| 11 | 121.408 | 0.05 | | |
| 12 | 25.636 | 1.71 | 1.95906 | 17.5 |
| 13 | −151.151 | (variable) | | |
| 14 (stop) | ∞ | (variable) | | |
| 15* | 9.885 | 2.80 | 1.55332 | 71.7 |
| 16* | −53.041 | 1.88 | | |
| 17 | 26.863 | 0.50 | 1.77250 | 49.6 |
| 18 | 9.379 | 0.48 | | |
| 19 | 11.452 | 0.50 | 1.80518 | 25.4 |
| 20 | 8.167 | 3.70 | 1.49700 | 81.5 |
| 21 | −18.467 | (variable) | | |
| 22 | −82.609 | 0.35 | 1.77250 | 49.6 |
| 23 | 7.654 | 1.30 | 1.68893 | 31.1 |
| 24 | 16.606 | (variable) | | |
| 25 | 21.561 | 2.76 | 1.65844 | 50.9 |
| 26 | −16.819 | 0.46 | 1.95906 | 17.5 |
| 27 | −26.253 | (variable) | | |
| 28 | ∞ | 1.00 | 1.51633 | 64.1 |
| 29 | ∞ | 1.40 | | |
| Image Plane | ∞ | | | |

Aspheric Surface Data

15th surface

K = 0.00000e+000 A4 = −8.86670e−005 A6 = 5.68922e−007 A8 = −5.36819e−008

16th surface

K = 0.00000e+000 A4 = 8.46965e−005 A6 = 6.80374e−007 A8 = −5.79594e−008

Various Data
Zoom Ratio 65.38

| | Wide Angle | Middle | Telephoto |
|---|---|---|---|
| Focal Length | 3.90 | 31.53 | 255.00 |
| F-number | 3.50 | 5.70 | 6.69 |
| Half Field Angle | 39.17 | 7.01 | 0.87 |
| Image Height | 3.18 | 3.88 | 3.88 |
| Overall Lens Length | 97.33 | 130.58 | 148.44 |
| BF | 11.06 | 12.11 | 7.47 |
| d5 | 0.75 | 44.84 | 70.29 |
| d13 | 32.86 | 3.70 | 0.66 |
| d14 | 13.38 | 10.44 | 0.56 |
| d21 | 2.00 | 8.32 | 12.76 |
| d24 | 2.88 | 16.77 | 22.31 |
| d27 | 9.00 | 10.05 | 5.41 |

Zoom Lens Unit Data

| Unit | Start Surface | Focal Length |
|---|---|---|
| 1 | 1 | 90.13 |
| 2 | 6 | −8.34 |
| 3 | 15 | 15.01 |
| 4 | 22 | −16.00 |
| 5 | 25 | 20.78 |

THIRD NUMERICAL EXAMPLE

Unit mm

Surface Data

| Surface Number | r | d | nd | νd |
|---|---|---|---|---|
| 1 | 109.566 | 1.50 | 1.91082 | 35.3 |
| 2 | 63.355 | 0.95 | | |
| 3 | 78.055 | 4.20 | 1.49700 | 81.5 |
| 4 | −323.701 | 0.05 | | |
| 5 | 46.999 | 4.95 | 1.43875 | 94.9 |
| 6 | 474.045 | (variable) | | |
| 7 | −183.661 | 0.69 | 1.83481 | 42.7 |
| 8 | 9.222 | 3.70 | | |
| 9 | −42.014 | 0.55 | 1.80400 | 46.6 |
| 10 | 119.053 | 1.67 | | |
| 11 | −17.906 | 0.55 | 1.83481 | 42.7 |
| 12 | −50.713 | 0.05 | | |
| 13 | 41.805 | 1.71 | 1.95906 | 17.5 |
| 14 | −61.232 | (variable) | | |
| 15 (stop) | ∞ | (variable) | | |
| 16* | 10.412 | 2.76 | 1.55332 | 71.7 |
| 17* | −281.013 | 2.23 | | |
| 18 | 28.652 | 0.50 | 1.77250 | 49.6 |
| 19 | 9.941 | 0.45 | | |
| 20 | 12.685 | 0.50 | 1.80518 | 25.4 |
| 21 | 9.079 | 3.68 | 1.49700 | 81.5 |
| 22 | −21.396 | (variable) | | |
| 23 | −87.387 | 0.35 | 1.77250 | 49.6 |
| 24 | 11.174 | 1.25 | 1.67270 | 32.1 |
| 25 | 47.322 | (variable) | | |
| 26 | 23.524 | 2.80 | 1.74320 | 49.3 |
| 27 | −21.546 | 0.46 | 1.95906 | 17.5 |
| 28 | −44.702 | (variable) | | |
| 29 | ∞ | 1.00 | 1.51633 | 64.1 |
| 30 | ∞ | 1.40 | | |
| Image Plane | ∞ | | | |

Aspheric Surface Data

16th surface

K = 0.00000e+000 A4 = −3.46811e−005 A6 = −1.80893e−006
A8 = −9.81749e−009

17th surface

K = 0.00000e+000 A4 = 7.91618e−005 A6 = −2.38849e−006

Various Data
Zoom Ratio 70.19

| | Wide angle | Middle | Telephoto |
|---|---|---|---|
| Focal Length | 3.69 | 30.91 | 259.00 |
| F-number | 3.30 | 5.70 | 6.90 |
| Half Field Angle | 38.45 | 7.14 | 0.86 |
| Image Height | 2.93 | 3.88 | 3.88 |
| Overall Lens Length | 104.28 | 138.11 | 164.83 |
| BF | 11.06 | 17.21 | 7.34 |
| d6 | 0.65 | 47.56 | 76.12 |
| d14 | 44.87 | 5.40 | 0.62 |
| d15 | 5.04 | 5.94 | 0.46 |
| d22 | 2.12 | 13.04 | 22.37 |
| d25 | 4.99 | 13.43 | 22.37 |
| d28 | 9.00 | 15.15 | 5.28 |

Zoom Lens Unit Data

| Unit | Start Surface | Focal Length |
|---|---|---|
| 1 | 1 | 96.59 |
| 2 | 7 | −8.98 |
| 3 | 16 | 18.33 |
| 4 | 23 | −31.04 |
| 5 | 26 | 23.62 |

FOURTH NUMERICAL EXAMPLE

Unit mm

Surface Data

| Surface Number | r | d | nd | νd |
|---|---|---|---|---|
| 1 | 80.767 | 1.50 | 1.80610 | 33.3 |
| 2 | 60.513 | 1.30 | | |
| 3 | 81.836 | 1.48 | 1.88300 | 40.8 |
| 4 | 65.177 | 4.60 | 1.49700 | 81.5 |
| 5 | 3036.621 | 0.05 | | |
| 6 | 49.663 | 4.70 | 1.43875 | 94.9 |
| 7 | 597.822 | (variable) | | |
| 8 | 253.729 | 0.69 | 1.83481 | 42.7 |
| 9 | 8.113 | 4.40 | | |
| 10 | −38.015 | 0.55 | 1.80400 | 46.6 |
| 11 | 355.340 | 1.60 | | |
| 12 | −15.804 | 0.55 | 1.83481 | 42.7 |
| 13 | −58.040 | 0.05 | | |
| 14 | 43.043 | 1.71 | 1.95906 | 17.5 |
| 15 | −52.459 | (variable) | | |
| 16 (stop) | ∞ | (variable) | | |
| 17* | 10.449 | 2.68 | 1.55332 | 71.7 |
| 18* | −204.427 | 2.29 | | |
| 19 | 26.739 | 0.50 | 1.77250 | 49.6 |
| 20 | 9.886 | 0.45 | | |
| 21 | 12.272 | 0.50 | 1.80518 | 25.4 |
| 22 | 8.791 | 3.68 | 1.49700 | 81.5 |
| 23 | −19.720 | (variable) | | |
| 24 | −77.639 | 0.35 | 1.77250 | 49.6 |
| 25 | 10.497 | 1.34 | 1.68893 | 31.1 |
| 26 | 35.854 | (variable) | | |
| 27 | 22.185 | 2.80 | 1.65844 | 50.9 |
| 28 | −16.540 | 0.46 | 1.95906 | 17.5 |
| 29 | −28.438 | (variable) | | |
| 30 | ∞ | 1.00 | 1.51633 | 64.1 |
| 31 | ∞ | 1.40 | | |
| Image Plane | ∞ | | | |

Aspheric Surface Data

17th surface

K = 0.00000e+000 A4 = −4.37613e−005 A6 = 1.04659e−006
A8 = −3.85362e−008

18th surface

K = 0.00000e+000 A4 = 8.26959e−005 A6 = 1.06108e−006
A8 = −4.27977e−008

Various Data
Zoom Ratio 81.07

| | Wide angle | Middle | Telephoto |
|---|---|---|---|
| Focal Length | 3.38 | 30.43 | 274.00 |
| F-number | 3.50 | 5.70 | 6.81 |
| Half Field Angle | 40.92 | 7.26 | 0.81 |
| Image Height | 2.93 | 3.88 | 3.88 |
| Overall Lens Length | 103.73 | 145.97 | 173.73 |
| BF | 11.06 | 14.73 | 8.10 |
| d7 | 0.59 | 51.96 | 84.48 |
| d15 | 32.52 | 2.17 | 0.62 |
| d16 | 15.12 | 9.21 | 0.46 |
| d23 | 1.68 | 12.94 | 21.62 |
| d26 | 4.53 | 16.74 | 20.21 |
| d29 | 9.00 | 12.67 | 6.04 |

Zoom Lens Unit Data

| Unit | Start Surface | Focal Length |
|---|---|---|
| 1 | 1 | 105.33 |
| 2 | 8 | −8.13 |
| 3 | 17 | 17.21 |
| 4 | 24 | −26.70 |
| 5 | 27 | 22.55 |

FIFTH NUMERICAL EXAMPLE

Unit mm

Surface Data

| Surface Number | r | d | nd | νd |
|---|---|---|---|---|
| 1 | 110.990 | 1.45 | 1.91082 | 35.3 |
| 2 | 68.442 | 4.60 | 1.43875 | 94.9 |
| 3 | 278.649 | 0.05 | | |
| 4 | 95.063 | 4.40 | 1.43875 | 94.9 |
| 5 | −711.794 | 0.05 | | |
| 6 | 60.097 | 4.40 | 1.43875 | 94.9 |
| 7 | 186.342 | (variable) | | |
| 8 | −334.745 | 0.69 | 1.83481 | 42.7 |
| 9 | 9.091 | 4.20 | | |
| 10 | −33.978 | 0.55 | 1.80400 | 46.6 |
| 11 | 99.713 | 1.70 | | |
| 12 | −17.217 | 0.55 | 1.83481 | 42.7 |
| 13 | −54.641 | 0.05 | | |
| 14 | 54.907 | 1.71 | 1.95906 | 17.5 |
| 15 | −43.318 | (variable) | | |
| 16 (stop) | ∞ | (variable) | | |
| 17* | 10.638 | 3.50 | 1.55332 | 71.7 |
| 18* | −88.378 | 1.86 | | |
| 19 | 26.571 | 0.50 | 1.77250 | 49.6 |
| 20 | 10.345 | 0.44 | | |
| 21 | 12.157 | 0.50 | 1.80518 | 25.4 |
| 22 | 8.906 | 3.65 | 1.45600 | 90.3 |
| 23 | −17.988 | (variable) | | |
| 24 | −608.977 | 0.35 | 1.77250 | 49.6 |
| 25 | 7.642 | 1.25 | 1.67270 | 32.1 |
| 26 | 20.430 | (variable) | | |
| 27 | 22.032 | 2.80 | 1.74320 | 49.3 |
| 28 | −17.550 | 0.46 | 1.95906 | 17.5 |
| 29 | −34.185 | (variable) | | |
| 30 | ∞ | 1.00 | 1.51633 | 64.1 |
| 31 | ∞ | 1.40 | | |
| Image Plane | ∞ | | | |

Aspheric Surface Data

17th surface

K = 0.00000e+000 A4 = −6.91642e−005 A6 = −5.84855e−007
A8 = −4.40916e−009

18th surface

K = 0.00000e+000 A4 = 7.44965e−005 A6 = −8.56635e−007
A8 = 6.78988e−010

Various Data
Zoom Ratio 99.76

| | Wide angle | Middle | Telephoto |
|---|---|---|---|
| Focal Length | 3.50 | 34.95 | 349.15 |
| F-number | 3.30 | 5.90 | 7.33 |
| Half Field Angle | 40.45 | 6.33 | 0.64 |
| Image Height | 2.98 | 3.88 | 3.88 |
| Overall Lens Length | 105.21 | 146.41 | 170.23 |
| BF | 10.71 | 17.37 | 3.44 |
| d7 | 0.65 | 54.30 | 79.57 |
| d15 | 43.84 | 4.31 | 0.60 |
| d16 | 4.48 | 5.58 | 0.49 |
| d23 | 2.10 | 11.38 | 18.07 |
| d26 | 3.72 | 13.75 | 28.35 |
| d29 | 8.65 | 15.31 | 1.38 |

Zoom Lens Unit Data

| Unit | Start Surface | Focal Length |
|---|---|---|
| 1 | 1 | 101.25 |
| 2 | 8 | −8.25 |
| 3 | 17 | 16.61 |
| 4 | 24 | −21.00 |
| 5 | 27 | 20.62 |

SIXTH NUMERICAL EXAMPLE

Unit mm

Surface Data

| Surface Number | r | d | nd | νd |
|---|---|---|---|---|
| 1 | 107.849 | 1.45 | 1.91082 | 35.3 |
| 2 | 66.919 | 4.60 | 1.43875 | 94.9 |
| 3 | 290.617 | 0.05 | | |
| 4 | 89.823 | 4.30 | 1.43875 | 94.9 |
| 5 | −971.001 | 0.05 | | |
| 6 | 58.981 | 4.40 | 1.43875 | 94.9 |
| 7 | 181.843 | (variable) | | |
| 8 | 8028.990 | 0.69 | 1.83481 | 42.7 |
| 9 | 8.729 | 4.20 | | |
| 10 | −38.448 | 0.55 | 1.80400 | 46.6 |
| 11 | 155.694 | 1.70 | | |
| 12 | −16.734 | 0.55 | 1.83481 | 42.7 |
| 13 | −63.456 | 0.05 | | |
| 14 | 51.187 | 1.71 | 1.95906 | 17.5 |
| 15 | −43.656 | (variable) | | |
| 16 (stop) | ∞ | (variable) | | |
| 17* | 10.653 | 3.50 | 1.55332 | 71.7 |
| 18* | −113.546 | 1.98 | | |
| 19 | 26.478 | 0.50 | 1.77250 | 49.6 |
| 20 | 10.256 | 0.44 | | |
| 21 | 12.235 | 0.50 | 1.80518 | 25.4 |
| 22 | 8.711 | 3.65 | 1.45600 | 90.3 |
| 23 | −21.088 | (variable) | | |
| 24 | −109.906 | 0.35 | 1.77250 | 49.6 |
| 25 | 8.692 | 1.25 | 1.67270 | 32.1 |
| 26 | 40.178 | (variable) | | |
| 27 | 21.785 | 2.80 | 1.74320 | 49.3 |
| 28 | −19.604 | 0.46 | 1.95906 | 17.5 |
| 29 | −41.971 | (variable) | | |
| 30 | ∞ | 1.00 | 1.51633 | 64.1 |
| 31 | ∞ | 1.40 | | |
| Image Plane | ∞ | | | |

Aspheric Surface Data

17th surface

K = 0.00000e+000 A4 = −7.62681e−005 A6 = −1.35038e−006
A8 = −7.47938e−009

18th surface

K = 0.00000e+000 A4 = 3.66618e−005 A6 = −1.90867e−006
A8 = 4.01731e−009

Various Data
Zoom Ratio 100.00

| | Wide Angle | Middle | Telephoto |
|---|---|---|---|
| Focal Length | 3.48 | 34.81 | 348.00 |
| F-number | 3.30 | 5.90 | 7.30 |
| Half Field Angle | 40.61 | 6.35 | 0.64 |
| Image Height | 2.98 | 3.88 | 3.88 |
| Overall Lens Length | 105.73 | 145.22 | 168.83 |
| BF | 10.71 | 19.85 | 3.62 |
| d7 | 0.50 | 52.11 | 76.87 |
| d15 | 43.22 | 4.09 | 0.62 |
| d16 | 5.99 | 5.63 | 0.45 |
| d23 | 2.54 | 12.46 | 20.80 |
| d26 | 3.04 | 11.35 | 26.74 |
| d29 | 8.65 | 17.79 | 1.56 |

Zoom Lens Unit Data

| Unit | Start Surface | Focal Length |
|---|---|---|
| 1 | 1 | 98.00 |
| 2 | 8 | −8.42 |
| 3 | 17 | 18.05 |
| 4 | 24 | −28.15 |
| 5 | 27 | 22.13 |

SEVENTH NUMERICAL EXAMPLE

Unit mm

Surface Data

| Surface Number | r | d | nd | vd |
|---|---|---|---|---|
| 1 | 81.397 | 1.45 | 1.91082 | 35.3 |
| 2 | 51.660 | 5.65 | 1.49700 | 81.5 |
| 3 | −1354.043 | 0.05 | | |
| 4 | 50.644 | 4.36 | 1.43875 | 94.9 |
| 5 | 240.463 | (variable) | | |
| 6 | 214.814 | 0.75 | 1.83481 | 42.7 |
| 7 | 8.494 | 5.44 | | |
| 8* | −20.911 | 0.50 | 1.88202 | 37.2 |
| 9 | 37.005 | 0.16 | | |
| 10 | 24.128 | 2.25 | 1.95906 | 17.5 |
| 11 | −101.151 | (variable) | | |
| 12 (stop) | ∞ | (variable) | | |
| 13* | 10.776 | 2.56 | 1.59201 | 67.0 |
| 14* | 92.245 | 1.38 | | |
| 15 | 19.755 | 0.50 | 1.83481 | 42.7 |
| 16 | 11.692 | 0.23 | | |
| 17 | 15.143 | 0.50 | 1.88300 | 40.8 |
| 18 | 9.198 | 2.92 | 1.49700 | 81.5 |
| 19 | −16.681 | (variable) | | |
| 20 | −316.197 | 0.50 | 1.83481 | 42.7 |
| 21 | 10.864 | 1.34 | 1.59270 | 35.3 |
| 22 | 26.493 | (variable) | | |
| 23 | 22.151 | 2.98 | 1.69680 | 55.5 |
| 24 | −16.075 | 0.50 | 2.00069 | 25.5 |
| 25 | −29.742 | (variable) | | |
| Image Plane | ∞ | | | |

Aspheric Surface Data

8th surface

K = 0.00000e+000 A4 = 1.75754e−005 A6 = 2.72897e−007
A8 = −1.65454e−009

13th surface

K = 4.60947e−001 A4 = −9.93967e−005 A6 = −1.75955e−006
A8 = −1.07588e−008

14th surface

K = 0.00000e+000 A4 = 7.67867e−005 A6 = −1.79385e−006
A8 = 4.70185e−009

Various Data
Zoom Ratio 67.75

| | Wide Angle | Middle | Telephoto |
|---|---|---|---|
| Focal Length | 3.69 | 30.39 | 250.00 |
| F-number | 3.50 | 4.50 | 5.88 |
| Half Field Angle | 40.73 | 7.27 | 0.89 |
| Image Height | 3.18 | 3.88 | 3.88 |
| Overall Lens Length | 102.99 | 132.57 | 156.92 |
| BF | 10.39 | 19.45 | 7.69 |
| d5 | 0.76 | 47.50 | 75.59 |
| d11 | 32.26 | 1.95 | 2.30 |
| d12 | 18.16 | 9.65 | 0.45 |
| d19 | 3.79 | 9.61 | 13.31 |
| d22 | 3.61 | 10.39 | 23.56 |
| d25 | 10.39 | 19.45 | 7.69 |

Zoom Lens Unit Data

| Unit | Start Surface | Focal Length |
|---|---|---|
| 1 | 1 | 96.44 |
| 2 | 6 | −8.65 |
| 3 | 13 | 16.23 |
| 4 | 20 | −20.92 |
| 5 | 23 | 22.09 |

EIGHTH NUMERICAL EXAMPLE

Unit mm

Surface Data

| Surface Number | r | d | nd | vd |
|---|---|---|---|---|
| 1 | 109.240 | 1.50 | 1.91082 | 35.3 |
| 2 | 63.423 | 0.95 | | |
| 3 | 77.510 | 4.20 | 1.49700 | 81.5 |
| 4 | −372.197 | 0.05 | | |
| 5 | 47.699 | 4.95 | 1.43875 | 94.9 |
| 6 | 490.395 | (variable) | | |
| 7 | −481.139 | 0.69 | 1.83481 | 42.7 |
| 8 | 9.025 | 3.70 | | |
| 9 | −67.315 | 0.55 | 1.80400 | 46.6 |
| 10 | 89.965 | 1.67 | | |
| 11 | −18.310 | 0.55 | 1.83481 | 42.7 |
| 12 | −77.206 | 0.05 | | |
| 13 | 36.670 | 1.71 | 1.95906 | 17.5 |
| 14 | −73.395 | (variable) | | |
| 15 (stop) | ∞ | (variable) | | |
| 16* | 10.354 | 2.76 | 1.55332 | 71.7 |
| 17* | −540.608 | 2.27 | | |
| 18 | 29.469 | 0.50 | 1.77250 | 49.6 |
| 19 | 9.977 | 0.45 | | |
| 20 | 12.500 | 0.50 | 1.80518 | 25.4 |
| 21 | 9.075 | 3.68 | 1.49700 | 81.5 |
| 22 | −20.052 | (variable) | | |
| 23 | −57.514 | 0.35 | 1.77250 | 49.6 |
| 24 | 10.615 | 1.25 | 1.67270 | 32.1 |
| 25 | 59.741 | (variable) | | |
| 26 | 23.478 | 2.80 | 1.74320 | 49.3 |
| 27 | −17.217 | 0.46 | 1.95906 | 17.5 |
| 28 | −32.674 | (variable) | | |
| 29 | −33.000 | 0.50 | 1.51633 | 64.1 |
| 30 | −94.500 | (variable) | | |
| 31 | ∞ | 1.00 | 1.51633 | 64.1 |
| 32 | ∞ | 0.40 | | |
| Image Plane | ∞ | | | |

Aspheric Surface Data

16th surface

K = 0.00000e+000 A4 = −3.79769e−005 A6 = −2.23452e−006
A8 = −1.20963e−008

17th surface

K = 0.00000e+000 A4 = 8.38291e−005 A6 = −3.00299e−006

Various Data
Zoom Ratio 75.00

| | Wide Angle | Middle | Telephoto |
|---|---|---|---|
| Focal Length | 3.69 | 31.99 | 276.75 |
| F-number | 3.30 | 5.70 | 6.90 |
| Half Field Angle | 38.45 | 6.91 | 0.80 |
| Image Height | 2.93 | 3.88 | 3.88 |
| Overall Lens Length | 99.29 | 136.45 | 164.06 |
| BF | 2.55 | 3.60 | 2.87 |
| d6 | 0.61 | 50.34 | 78.51 |
| d14 | 43.09 | 3.89 | 0.62 |
| d15 | 3.56 | 6.10 | 0.46 |
| d22 | 2.45 | 13.73 | 20.59 |
| d25 | 2.58 | 9.40 | 22.29 |
| d28 | 8.37 | 13.29 | 2.61 |
| d30 | 1.49 | 2.54 | 1.82 |

Zoom Lens Unit Data

| Unit | Start Surface | Focal Length |
|---|---|---|
| 1 | 1 | 98.74 |
| 2 | 7 | −9.02 |
| 3 | 16 | 18.07 |
| 4 | 23 | −29.12 |

-continued

Unit mm

| 5 | 26 | 21.06 |
| 6 | 29 | −98.48 |

TABLE 1

| Conditional equation | Exemplary Embodiments |  |  |  |  |  |  |  |
|---|---|---|---|---|---|---|---|---|
|  | 1 | 2 | 3 | 4 | 5 | 6 | 7 | 8 |
| (1) | 13.03 | 13.11 | 16.41 | 20.71 | 18.58 | 18.13 | 14.62 | 17.55 |
| (2) | −10.01 | −15.94 | −8.34 | −10.26 | −16.63 | −12.36 | −11.95 | −9.50 |
| (3) | 0.36 | 0.35 | 0.37 | 0.38 | 0.29 | 0.28 | 0.39 | 0.36 |
| (4) | −10.26 | −10.80 | −10.75 | −12.96 | −12.27 | −11.63 | −11.14 | −10.95 |
| (5) | 1.38 | 1.55 | 1.44 | 1.39 | 1.92 | 1.81 | 1.52 | 1.63 |
| (6) | 22.09 | 23.11 | 26.18 | 31.16 | 28.93 | 28.16 | 26.13 | 26.76 |
| (7) | 0.068 | 0.062 | 0.053 | 0.046 | 0.050 | 0.048 | 0.069 | 0.052 |
| (8) | 1.497 | 1.497 | 1.468 | 1.468 | 1.439 | 1.439 | 1.468 | 1.468 |
| (9) | 81.54 | 81.54 | 88.24 | 88.24 | 94.93 | 94.93 | 88.24 | 88.24 |
| (10) | −0.065 | −0.072 | −0.058 | −0.051 | −0.040 | −0.038 | −0.084 | −0.048 |

Next, an exemplary embodiment of a digital still camera using a zoom lens described in the exemplary embodiments as a photographic optical system will be described with reference to FIG. 17.

FIG. 17 illustrates a camera body 20, and a photographic optical system 21 including any of the zoom lenses described in the first to eighth exemplary embodiments. A solid-state image sensor (photoelectric conversion element) 22 is a CCD sensor, a CMOS sensor, or the like that is built-in the camera body, and receives light of an object image formed by the photographic optical system 21. A memory 23 records information corresponding to the object image photoelectrically converted by the solid-state image sensor 22. A finder 24 includes a liquid crystal display panel and the like, and is used for observation of the object image formed on the solid-state image sensor 22.

By the application of the zoom lens of an exemplary embodiment of the present invention to an image pickup apparatus such as a digital still camera, a small image pickup apparatus having high magnification and high optical performance can be obtained.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-158962, filed Aug. 4, 2014, which is hereby incorporated by reference herein in its entirety.

What is claimed is:

1. A zoom lens comprising, in order from an object side to an image side:
    a first lens unit having positive refractive power;
    a second lens unit having negative refractive power;
    a third lens unit having positive refractive power; and
    a rear lens group including a plurality of lens units including a lens unit having negative refractive power,
    wherein a distance between adjacent lens units is changed in zooming,
    wherein two or more lens units of the lens units included in the rear lens group are moved in zooming from a wide-angle end to a telephoto end, and
    wherein following conditional expressions are satisfied:

$12.00 < M1/fw < 23.00$ $-18.00 < ft/frn < -8.30$ where a focal length of the zoom lens at the wide-angle end is fw, a focal length of the zoom lens at the telephoto end is ft, an amount of movement of the first lens unit on an optical axis in zooming from the wide-angle end to the telephoto end is M1, and a focal length of a lens unit Lrn is frn, the lens unit Lrn being a lens unit having a shortest focal length among lens units having negative refractive power included in the rear lens group.

2. The zoom lens according to claim 1, wherein a following conditional expression is satisfied:

$0.20 < f1/ft < 0.50$ where a focal length of the first lens unit is f1.

3. The zoom lens according to claim 1, wherein a following conditional expression is satisfied:

$-15.00 < f1/f2 < -9.00$ where a focal length of the first lens unit is f1, and a focal length of the second lens unit is f2.

4. The zoom lens according to claim 1, wherein a following conditional expression is satisfied:

$1.30 < \beta rt/\beta rw < 2.50$ where a lateral magnification of the rear lens group at the wide-angle end is βrw, and a lateral magnification of the rear lens group at the telephoto end is βrt.

5. The zoom lens according to claim 1, wherein a following conditional expression is satisfied:

$20.00 < f1/fw < 38.00$ where a focal length of the first lens unit is f1.

6. The zoom lens according to claim 1, wherein a following conditional expression is satisfied:

$0.025 < Mrn/ft < 0.075$ where an amount of movement of the lens unit Lrn in zooming from the wide-angle end to the telephoto end is Mrn.

7. The zoom lens according to claim 1, wherein following conditional expression are satisfied:

$1.400 < Ndave1p < 1.520$ $75.00 < vdave1p < 100.00$ where an average value of refractive indexes of positive lenses included in the first lens unit based on a d line is Ndave1p, and an average value of Abbe numbers of the positive lenses included in the first lens unit is vdave1p.

8. The zoom lens according to claim 1, wherein a following conditional expression is satisfied:

$$-0.100 < M2/ft < -0.025$$

where an amount of movement of the second lens unit in zooming from the wide-angle end to the telephoto end is M2.

9. The zoom lens according to claim 1, wherein the lens unit Lrn includes a cemented lens in which a positive lens and a negative lens are cemented.

10. The zoom lens according to claim 1, wherein the rear lens group consists of, in order from the object side to the image side, a fourth lens unit having negative refractive power, and a fifth lens unit having positive refractive power.

11. The zoom lens according to claim 1, wherein the rear lens group consists of, in order from the object side to the image side, a fourth lens unit having negative refractive power, a fifth lens unit having positive refractive power, and a sixth lens unit having negative refractive power.

12. The zoom lens according to claim 1, forming an image on a solid-state image sensor.

13. An image pickup apparatus comprising:
a zoom lens according to claim 1; and
an image sensor configured to receive an image formed by the zoom lens.

* * * * *